United States Patent
Agarwal et al.

(10) Patent No.: US 10,484,999 B2
(45) Date of Patent: Nov. 19, 2019

(54) TRIGGERS FOR USER EQUIPMENT TRANSMISSIONS TO SUPPORT UPLINK BASED MOBILITY

(71) Applicant: QUALCOMM Incorporated, San Diego, CA (US)

(72) Inventors: Ravi Agarwal, San Diego, CA (US); Gavin Bernard Horn, La Jolla, CA (US); Keiichi Kubota, San Diego, CA (US); Haitong Sun, San Diego, CA (US); Tingfang Ji, San Diego, CA (US); Kambiz Azarian Yazdi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/661,228

(22) Filed: Jul. 27, 2017

(65) Prior Publication Data

US 2018/0092083 A1  Mar. 29, 2018

Related U.S. Application Data

(60) Provisional application No. 62/401,418, filed on Sep. 29, 2016.

(51) Int. Cl.
*H04W 4/00* (2018.01)
*H04W 72/04* (2009.01)
(Continued)

(52) U.S. Cl.
CPC ..... *H04W 72/048* (2013.01); *H04W 72/0413* (2013.01); *H04L 5/0055* (2013.01); *H04W 68/02* (2013.01)

(58) Field of Classification Search
CPC .... H04L 5/0055; H04W 68/02; H04W 60/04; H04W 72/048; H04W 72/0413
(Continued)

(56) References Cited

U.S. PATENT DOCUMENTS 6,330,446 B1   12/2001  Mori
9,307,570 B2   4/2016   Pradas et al.
(Continued)

FOREIGN PATENT DOCUMENTS

EP   1821560 A1   8/2007
WO   9306685 A1   4/1993
(Continued)

OTHER PUBLICATIONS

International Search Report and Written Opinion—PCT/US2017/044473—ISA/EPO—dated Nov. 7, 2017.
(Continued)

*Primary Examiner* — Charles T Shedrick
(74) *Attorney, Agent, or Firm* — Patterson & Sheridan, LLP

(57) ABSTRACT

Certain aspects of the present disclosure provide triggers for user equipment (UE) transmissions to support uplink based mobility in a wireless communication system. According to certain aspects, a method of wireless communication by a user equipment (UE) is provided. The method generally includes receiving a configuration indicating one or more triggers for transmitting on an uplink access channel, wherein the one or more triggers comprise a first indication of mobility of the UE, determining, based at least in part on detection of one of the one or more triggers, to transmit on the uplink access channel, transmitting a signal on the uplink access channel, and receiving, in response to the transmission of the signal on the uplink access channel, a second
(Continued)

indication of at least one of: confirmation of reception of the signal or a paging notification.

25 Claims, 16 Drawing Sheets

(51) Int. Cl.
    *H04L 5/00* (2006.01)
    *H04W 68/02* (2009.01)
(58) Field of Classification Search
    USPC .......................................................... 370/329
    See application file for complete search history.

(56) References Cited

U.S. PATENT DOCUMENTS

| | | | |
|---|---|---|---|
| 9,356,723 B2 | 5/2016 | Kim et al. | |
| 9,363,799 B2 | 6/2016 | Park et al. | |
| 2009/0097444 A1* | 4/2009 | Lohr | H04W 72/14 370/329 |
| 2010/0246467 A1 | 9/2010 | Song et al. | |
| 2016/0270013 A1* | 9/2016 | Soriaga | H04W 56/0015 |

FOREIGN PATENT DOCUMENTS

| | | |
|---|---|---|
| WO | WO-2016117772 A1 | 7/2016 |
| WO | WO-2016153548 A1 | 9/2016 |

OTHER PUBLICATIONS

Qualcomm Incorporated: "DL and UL based Mobility Procedures" 3GPP DRAFT; R1-166386, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051125353, Retrieved from the Internet: URL: http://www.3gpp.org/ftp/Meetings_3GPP_SYNC/RAN1/Docs/ [retrieved on Aug. 21, 2016], 4 pages.
Qualcomm Incorporated, "Uplink Based Mobility Physical Channels", 3GPP DRAFT, R1-166387, 3rd Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 5 pages, XP051125354, Retrieved from the Internet: URL:http://www.3gpp.org/ftp/Meetings3GPPSYNC/RAN1 /Docs/ [retrieved on Aug. 21, 2016].

* cited by examiner

TRIGGERS FOR USER EQUIPMENT TRANSMISSIONS TO SUPPORT UPLINK BASED MOBILITY

CROSS-REFERENCE TO RELATED APPLICATIONS

The present Application for Patent claims priority to U.S. Provisional Application No. 62/401,418, filed Sep. 29, 2016, which is assigned to the assignee of the present application and hereby expressly incorporated by reference herein in its entirety.

BACKGROUND

Field of the Disclosure

Aspects of the present disclosure generally relate to wireless communication systems, and more particularly, to triggers for user equipment (UE) transmissions to support uplink based mobility in a wireless communication system.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). NR is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In an aspect of the present disclosure, a method for wireless communications is provided. The method may be performed, for example, by a user equipment (UE). The method generally includes receiving a configuration indicating one or more triggers for transmitting on an uplink access channel, wherein the one or more triggers comprise a first indication of mobility of the UE, determining, based at least in part on detection of one of the one or more triggers, to transmit on the uplink access channel, transmitting a signal on the uplink access channel, and receiving, in response to the transmission of the signal on the uplink access channel, an indication of at least one of: confirmation of reception of the signal, or a paging notification.

In an aspect of the present disclosure, a method for wireless communications is provided. The method may be performed, for example, by a base station (BS). The method generally includes transmitting a configuration indicating one or more triggers for a user equipment (UE) to transmit on an uplink access channel, wherein the one or more triggers comprise a first indication of mobility of the UE, receiving a signal on the uplink access channel from the UE, and transmitting, in response to the signal, a second indication of at least one of: confirmation of reception of the signal, or a paging notification.

In an aspect of the present disclosure, a method for wireless communications is provided. The method may be performed, for example, by a user equipment (UE). The method generally includes receiving a configuration indicating one or more triggers for transmitting on an uplink access channel, receiving an indication of a request to transmit on the uplink access channel or of a keep-alive signal, determining, based at least in part on the indication, whether to transmit on the uplink access channel, and transmitting a signal on the uplink access channel, if the determination was to transmit on the uplink access channel.

In an aspect of the present disclosure, a method for wireless communications is provided. The method may be performed, for example, by a base station (BS). The method generally includes transmitting a configuration indicating one or more triggers for a user equipment (UE) to transmit on an uplink access channel, determining to transmit an indication, to the UE, of a request to transmit on the uplink access channel or of a keep-alive signal, transmitting the indication to the UE, and receiving a signal on the uplink access channel from the UE.

In an aspect of the present disclosure, a method for wireless communications is provided. The method may be performed, for example, by a user equipment (UE). The method generally includes receiving a configuration indicating one or more triggers for transmitting on an uplink access channel, receiving a paging notification, wherein the paging notification is transmitted by a plurality of cells, and determining, based at least in part on the paging notification, whether to transmit on the uplink access channel.

In an aspect of the present disclosure, a method for wireless communications is provided. The method may be performed, for example, by a base station (BS). The method generally includes transmitting a configuration indicating one or more triggers for a user equipment (UE) to transmit on an uplink access channel and transmitting a paging notification, to the UE, comprising a single frequency network (SFN) transmission, wherein each cell of a plurality of cells transmits an identical transmission simultaneously.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
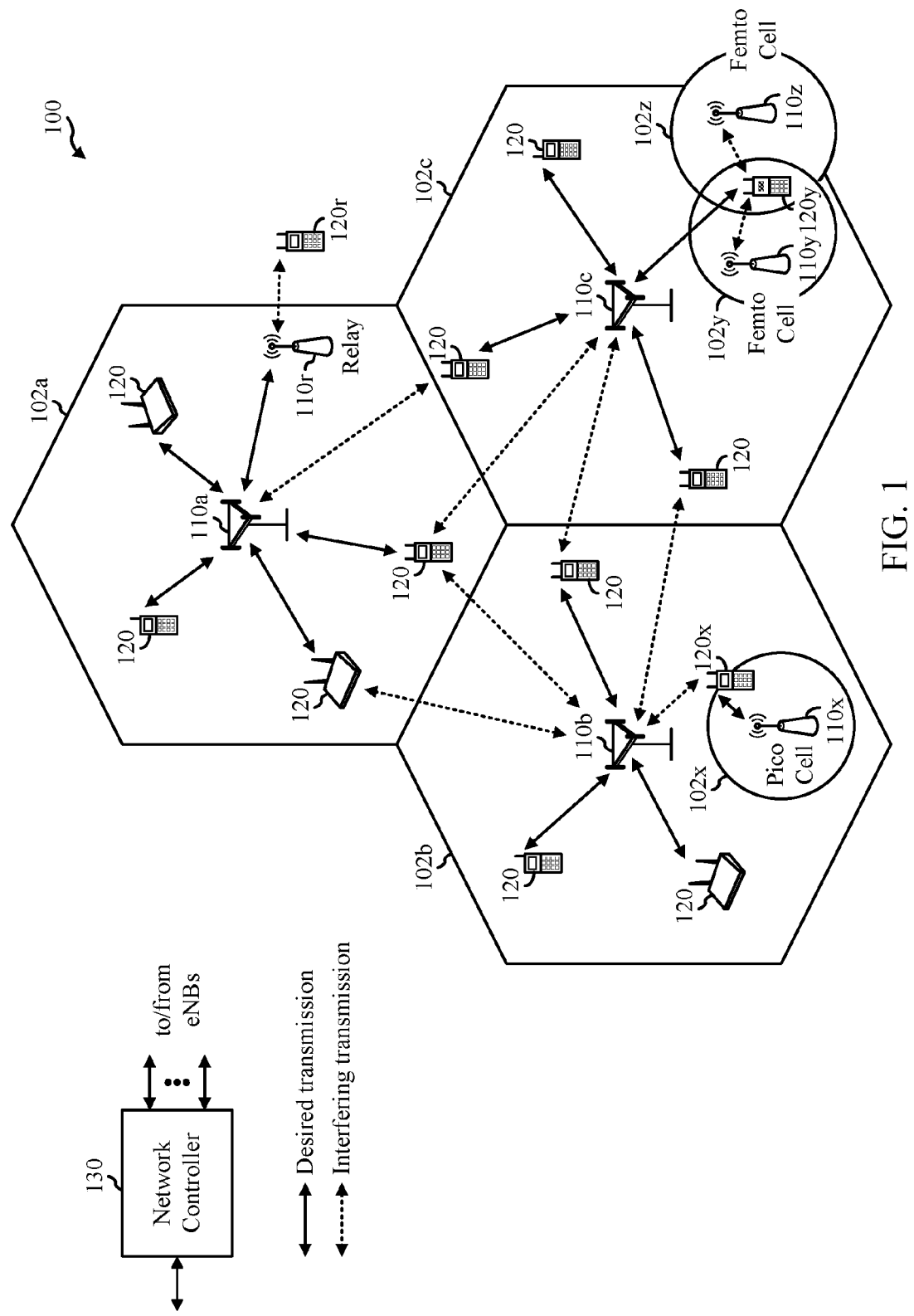
FIG. 1 is a block diagram conceptually illustrating an example telecommunications system, according to aspects of the present disclosure.

Aspects of the present disclosure provide apparatus, methods, processing systems, and computer program products for determining a precoding matrix for a user equipment to use in transmitting an uplink signal in a wireless communications system, such as a new radio (NR) system. New radio may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include enhanced mobile broadband (eMBB) techniques targeting wide bandwidth (e.g., 80 MHz and beyond) communications, millimeter wave (mmW) techniques targeting high carrier frequency (e.g., 60 GHz) communications, massive machine type communications (mMTC) techniques targeting non-backward compatible machine type communication (MTC) techniques, and mission critical techniques targeting ultra reliable low latency communications (URLLC). For these general topics, different techniques are considered, including coding techniques, such as low-density parity check (LDPC) coding and polar coding. An NR cell may refer to a cell operating according to the new air interface or fixed transport layer. An NR NodeB (e.g., a 5G NodeB) may correspond to one or more transmission and reception points (TRPs). A 5G NodeB may also be referred to as an access node (AN), and may comprise an access node controller (ANC) and one or more TRPs.

A UE may exchange (e.g., transmit and/or receive) packets with a BS. According to previously known techniques, a BS determines a precoding matrix for a UE to use when transmitting to the BS and transmits an index, to a codebook of precoding matrices, to the UE to indicate to the UE the determined precoding matrix. According to aspects of the present disclosure, a UE may determine a precoding matrix to use in transmitting to a BS, based on a precoding used by the BS in transmitting a reference signal to the UE and/or based on channel conditions between the UE and the BS Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio or 5G network. UEs 120 may be configured to perform the operations 900, 1100, and/or 1300, discussed in more detail below with reference to FIGS. 9, 11, and 13, for wirelessly communicating messages with a cell. BS 110 may comprise a transmission and reception point (TRP) configured to perform the operations 1000, 1200, and/or 1400, discussed in more detail below with reference to FIGS. 10, 12, and 14, for wirelessly communicating messages to the UE 120. The NR network may include a central unit that may be configured, with the UEs 120 and the BS 110, to perform operations related to measurement configuration, measurement reference signal transmission, monitoring, detection, measurement, and measurement reporting.

The system illustrated in FIG. 1 may be, for example, a long term evolution (LTE) network. The wireless network 100 may include a number of BSs (e.g., NodeBs, evolved NodeBs (eNB), 5G NodeBs, access nodes, TRPs, etc.) 110 and other network entities. A BS may be a station that communicates with the UEs and may also be referred to as a NodeB, an enhanced NodeB (eNodeB), a gateway-station NodeB (gNB), an access point, etc. A NodeB and 5G NodeB (e.g., a transmission and reception point, an access node) are other examples of stations that communicate with the UEs.

Each BS 110 may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscriptions. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro NodeB. A BS for a pico cell may be referred to as a pico NodeB. A BS for a femto cell may be referred to as a femto NodeB or a home NodeB. In the example shown in FIG. 1, the BSs 110a, 110b and 110c may be macro NodeBs for the macro cells 102a, 102b and 102c, respectively. The BS 110x may be a pico NodeB for a pico cell 102x. The BSs 110y and 110z may be femto NodeBs for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay NodeB, a relay, etc.

The wireless network 100 may be a heterogeneous network that includes BSs of different types, e.g., macro NodeBs, pico NodeBs, femto NodeBs, relays, transmission and reception points (TRPs), etc. These different types of BSs may have different transmit power levels, different coverage areas, and different impact on interference in the wireless network 100. For example, macro NodeBs may have a high transmit power level (e.g., 20 Watts) whereas pico NodeBs, femto NodeBs and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro NodeBs, pico NodeBs, femto NodeBs, relays, access nodes, TRPs, etc. In FIG. 1, a solid line with double arrows indicates desired transmissions between a UE and a serving NodeB, which is a NodeB designated to serve the UE on the downlink and/or uplink. A dashed line with double arrows indicates interfering transmissions between a UE and a NodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
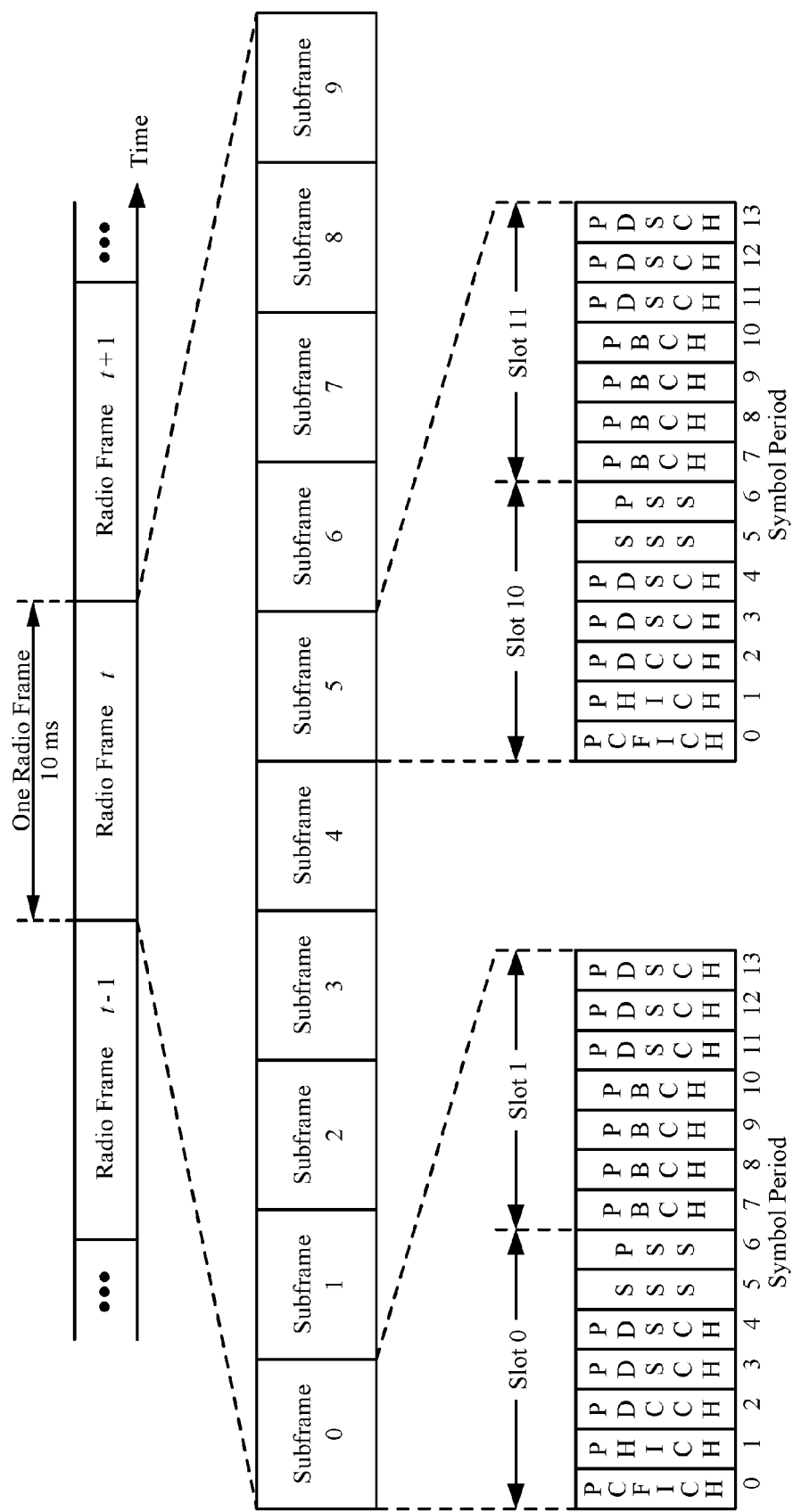
FIG. 2 is a block diagram conceptually illustrating an example downlink frame structure in a telecommunications system, according to aspects of the present disclosure.

FIG. 2 shows a downlink (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, a NodeB may send a primary synchronization signal (PSS) and a secondary synchronization signal (SSS) for each cell served by the NodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The NodeB may send a Physical Broadcast Channel (PBCH) in symbol periods 0 to 3 in slot 1 of sub-frame 0. The PBCH may carry certain system information.

The NodeB may send a Physical Control Format Indicator Channel (PCFICH) in a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The NodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The NodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The NodeB may send the PSS, SSS and PBCH in the center 1.08 MHz of the system bandwidth used by the NodeB. The NodeB may send the PCFICH and PHICH across the entire system bandwidth in each symbol period in which these channels are sent. The NodeB may send the PDCCH to groups of UEs in certain portions of the system bandwidth. The NodeB may send the PDSCH to specific UEs in specific portions of the system bandwidth. The NodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A NodeB may send the PDCCH to the UE in any of the combinations that the UE will search.

A UE may be within the coverage of multiple NodeBs. One of these NodeBs may be selected to serve the UE. The serving NodeB may be selected based on various criteria such as received power, path loss, signal-to-noise ratio (SNR), etc.

Figure 3:
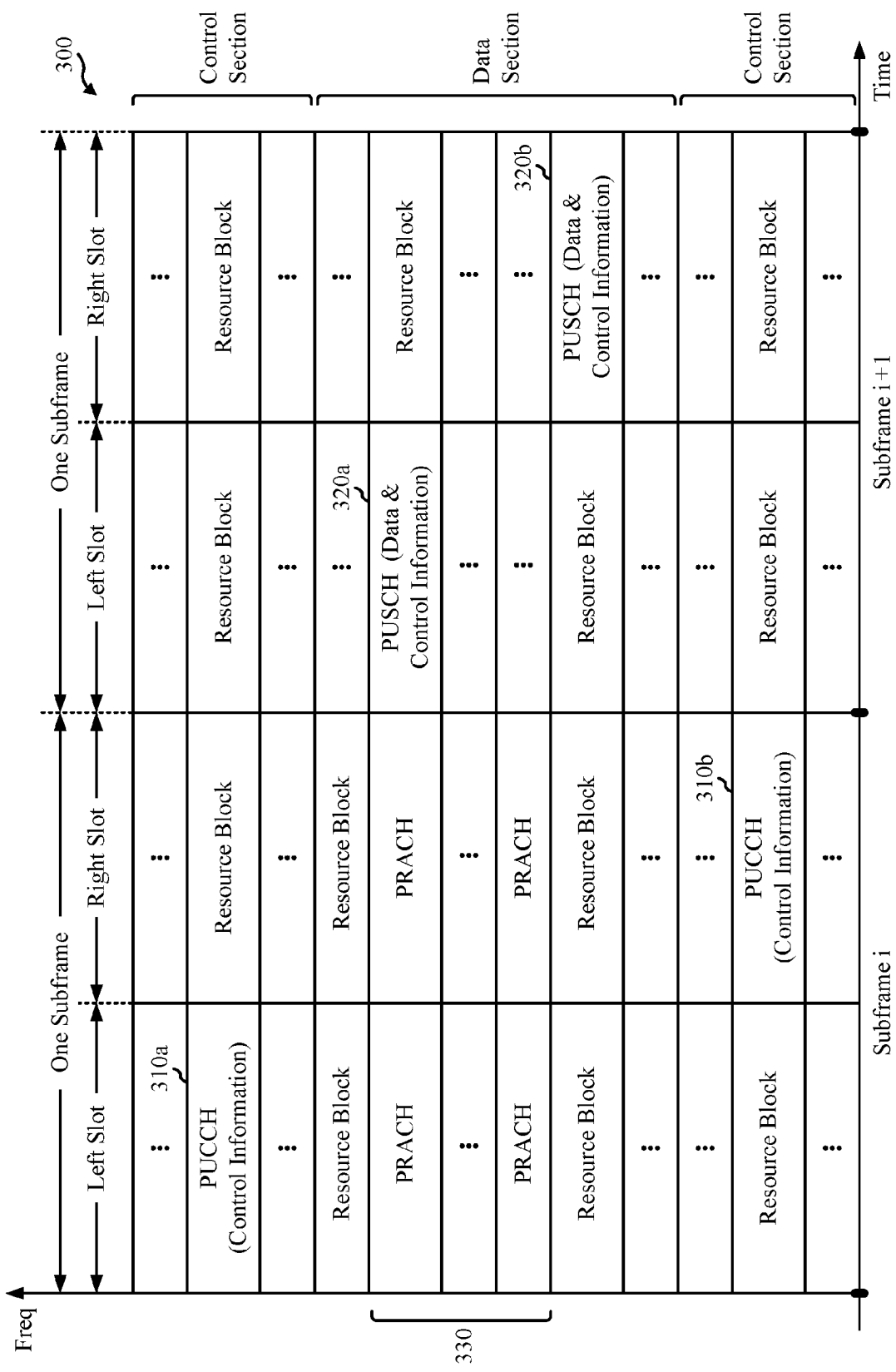
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a NodeB. The UE may also be assigned resource blocks 320a, 320b in the data section to transmit data to the NodeB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
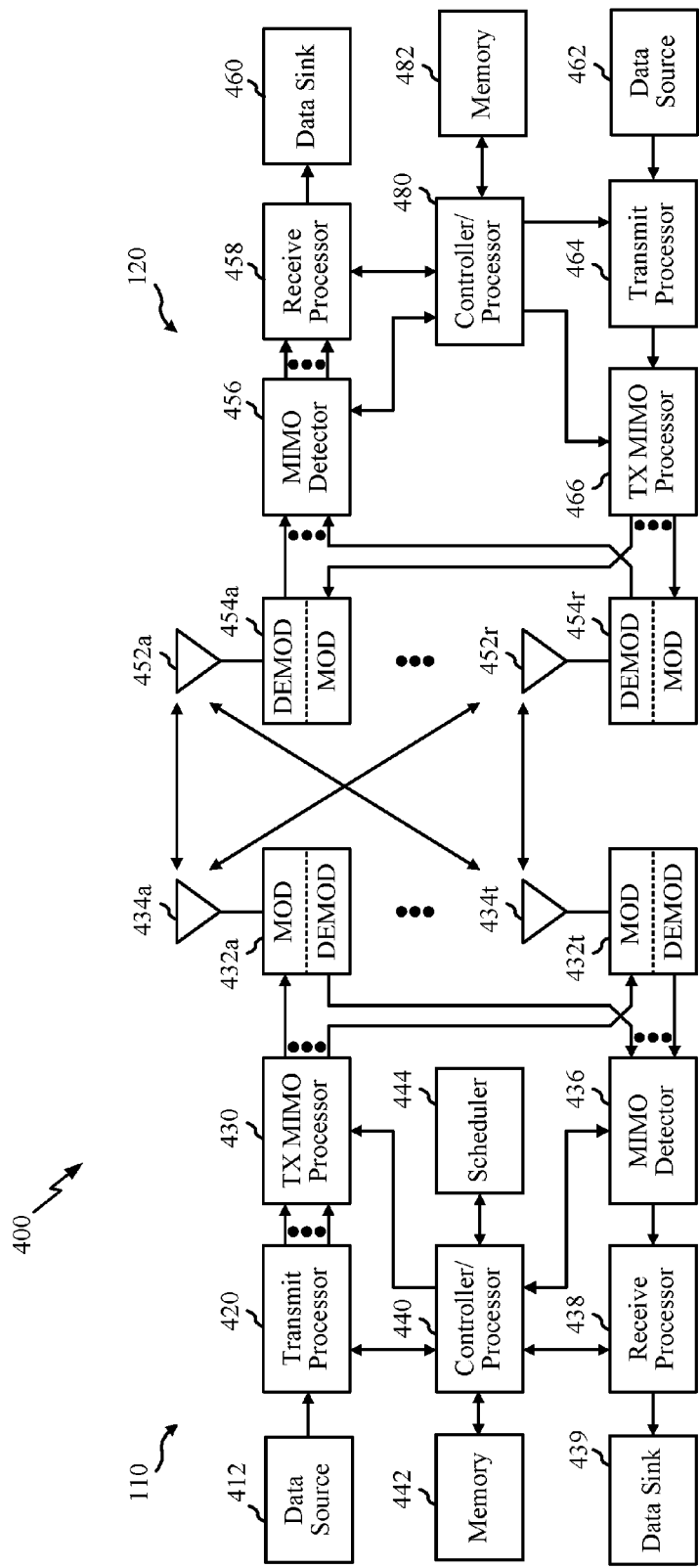
FIG. 4 is a block diagram conceptually illustrating a design of an example base station (BS) and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 13-15. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 13-15, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
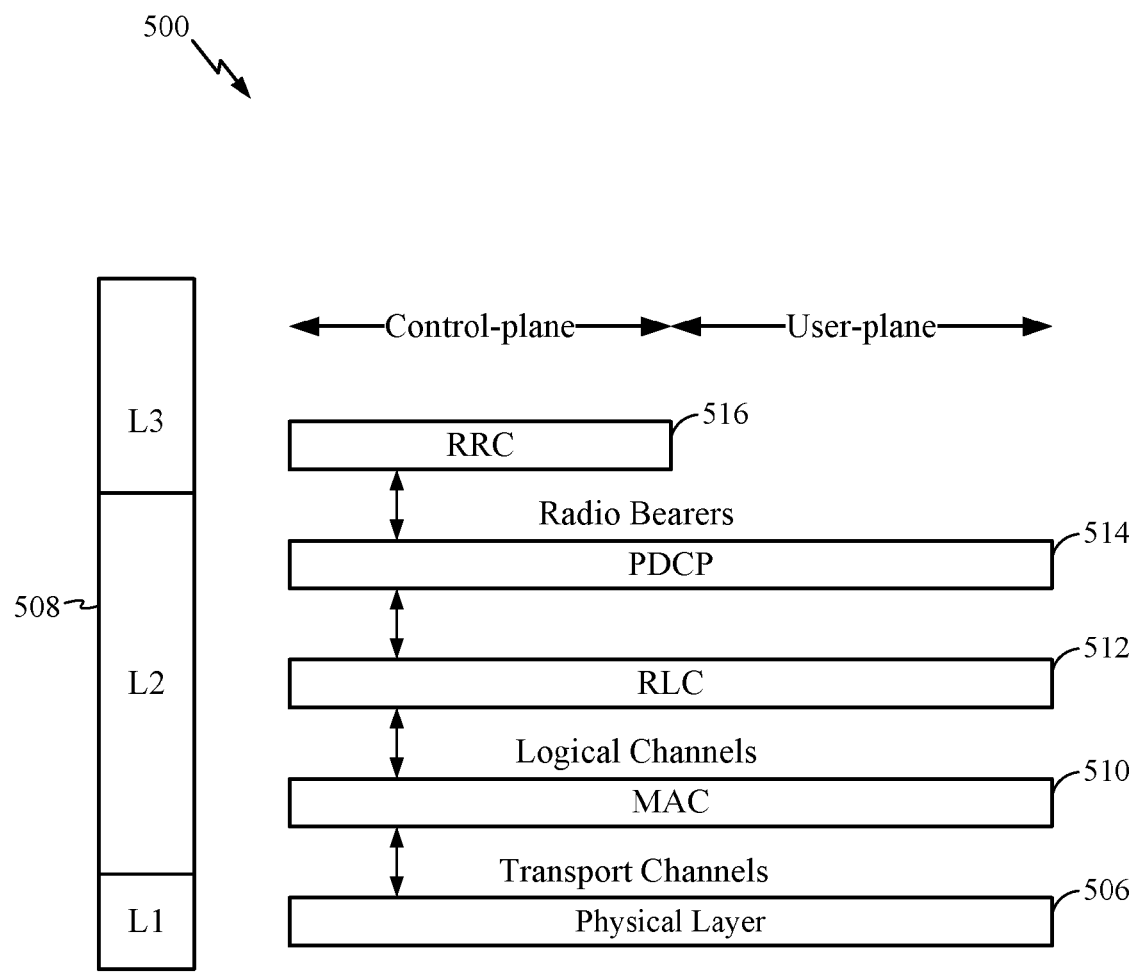
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the BS and the UE.

A UE may be in one of a plurality of operating states. One of the states may be referred to as an RRC_IDLE state. In the RRC_IDLE state, the UE may not have an active connection to an AN, and the AN does not have a context for the UE.

Another of the operating states may be an inactive state. In the inactive state, there is a UE context in the AN, but no active connection between the UE and the AN. The inactive state may be referred to as "RRC_COMMON," "RRC_INACTIVE," "RRC_DORMANT," or as an "inactive state in RRC_CONNECTED mode" and such terms are used interchangeably herein. In the inactive state, the UE does not have any dedicated resources (e.g., time and frequency resources for the UE to transmit on that other UEs are not also transmitting on, time and frequency resources for signals that only the UE is intended to receive). The UE may monitor a paging channel with a long discontinuous reception (DRX) cycle (e.g., around 320 ms to 2560 ms). The UE can receive multimedia broadcast multicast service (MBMS) data while in this state. If the UE obtains data to transmit (e.g., a user activates the UE to start a voice call) to the network (e.g., to a BS or via a BS to another entity), then the UE can perform either a state transition procedure into RRC_CONNECTED mode (e.g., by sending an RRC connection resume message to an AN) or a data transmission procedure that may include contention based access (e.g., performing a contention procedure to access a BS).

Another of the operating states may be an active state. In the active state, there is a UE context in the AN and an active connection between the UE and the AN. In the active state, the UE may have dedicated resources for transmissions to or from the AN and other devices. The active state may be referred to as "RRC_CONNECTED mode," "RRC_CONNECTED active state," "RRC_DEDICATED," "RRC_ACTIVE," or "active state in RRC_CONNECTED mode" and such terms are used interchangeably herein. When the AN obtains information that the AN should set up an RRC connection with dedicated resources for the UE (e.g., the AN receives an RRC connection resume request message from the UE, the AN obtains data to be transmitted to the UE), then the AN may send a transmission (e.g., a page) to the UE to cause the UE to transition to the active state. When the AN acknowledges the RRC connection resume request message, then the UE may enter the active state.

Figure 6:
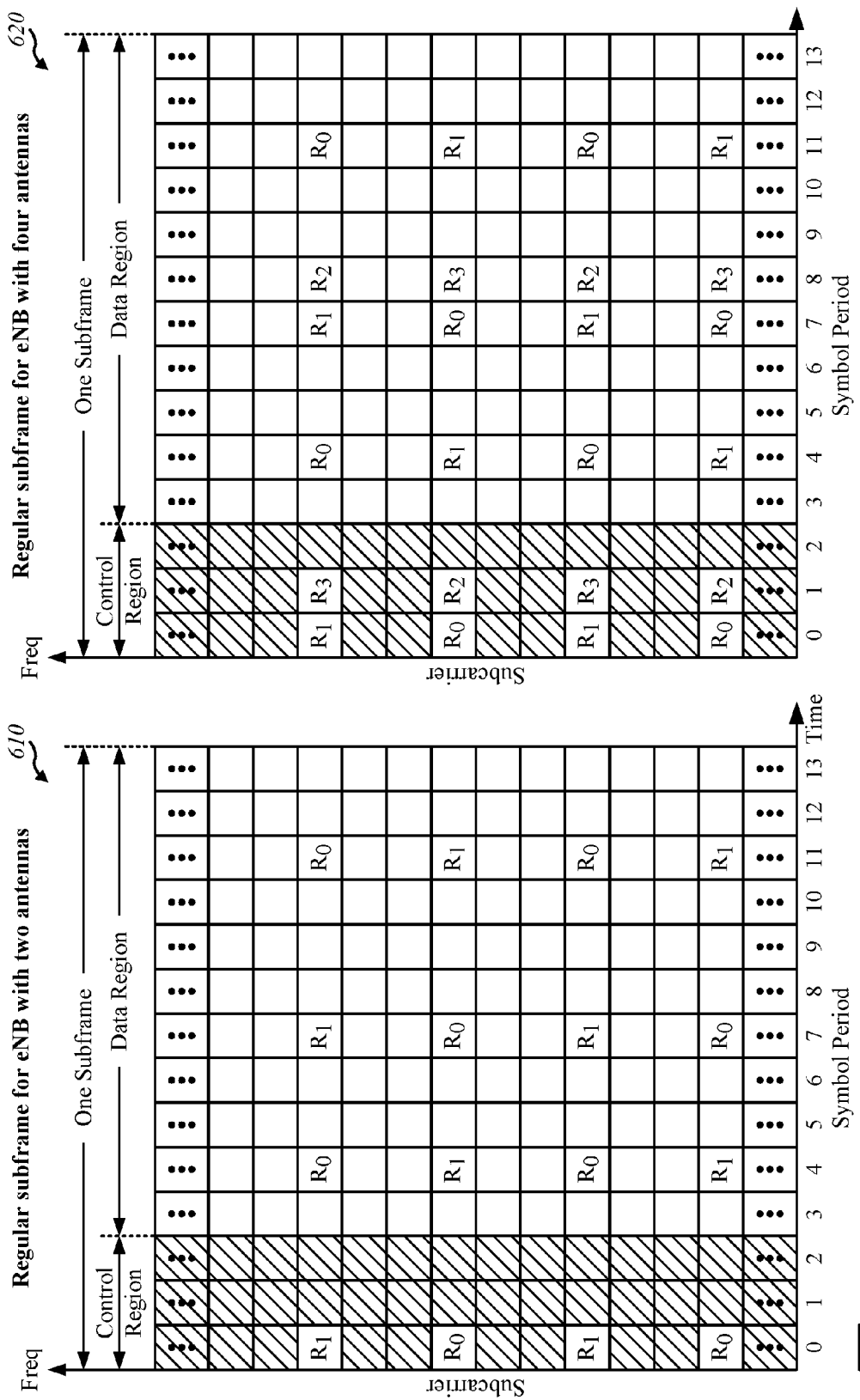
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a BS equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a BS equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different BSs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

New radio (NR) may refer to radios configured to operate according a wireless standard, such as 5G (e.g. wireless network 100). NR may include enhanced mobile broadband (eMBB) techniques targeting wide bandwidth (e.g. 80 MHz beyond) communications, millimeter wave (mmW) techniques targeting high carrier frequency (e.g. 60 GHz) communications, massive MTC (mMTC) techniques targeting non-backward compatible MTC communications, and mission critical techniques targeting ultra reliable low latency communications (URLLC).

NR cell may refer to a cell operating in the NR network. An NR BS (e.g., BS 110) may correspond to one or multiple transmission and reception points (TRPs). As used herein, a cell may refer to a combination of downlink (and potentially also uplink) resources. A linking between a carrier frequency of the downlink resources and a carrier frequency of the uplink resources may be indicated in system information (SI) transmitted on the downlink resources. For example, system information can be transmitted in a physical broadcast channel (PBCH) carrying a master information block (MIB).

NR RAN architecture may include a central unit (CU). The CU may be an Access node controller (ANC). The CU may terminate a backhaul interface to a radio access network core network (RAN-CN) and/or terminate a backhaul interface to a neighbor RAN node. The RAN may include a distributed unit that may be one or more TRPs that may be connected to one or more ANCs. TRPs may advertise system information (e.g., a globally unique TRP ID), may include PDCP, RLC, and/or MAC functions, may comprise one or more antenna ports, may be configured to individually (e.g., dynamic selection) or jointly (e.g., joint transmission with other TRPs) transmit signals, and may serve traffic to one or more UEs.

Wireless standards, such as 5G, may include latency and reliability requirements. Latency in a network may refer to the amount of time required for a packet of data to get from one point in the network to another point in the network. For example, latency in the user plane may be defined based on the time required for a successful delivery of an application layer packet from a layer 2 or 3 medium access control (MAC) service data unit (SDU) ingress point to a layer 2 or 3 MAC SDU egress point through a radio interface. Average latency for URLLC may target 0.5 ms for UL and 0.5 ms for DL in the user plane for certain standards. Average latency for eMBB may target 4 ms for UL and DL, and for mMTC, latency may be no worse than 10 seconds on UL for a 20 byte application packet (105 bytes at the PHY layer with uncompressed IP headers) at 164 dB minimum coupling loss (MCL).

A wireless standard may include a reliability requirement separate from the latency requirement. Reliability in a network may refer to a probability of successfully transmitting X number of bytes within 1 ms, where 1 ms is the time to deliver a small packet from a protocol layer 2 or 3 SDU ingress point to an egress point, at a certain channel quality. For example, reliability for URLLC may be $1 \times 10^{-5}$ within 1 ms for X number of bytes (e.g., 20 bytes), with a user latency of 1 ms. As another example, enhanced vehicle-to-X (eV2X) may require reliability of $1 \times 10^{-5}$ for 300 bytes within 1 ms. Additionally, user plane latency of 3-10 ms for direct communications via a sidelink and communication range of, for example, a few meters, along with user plane latency of 2 ms when a packet is relayed via a BS may be required.

To achieve $1 \times 10^{-5}$ reliability within 1 ms along with the target 0.5 ms latency for URLLC services, interference from other URLLC users as well as other services, such as eMBB users, should be minimized. For DL, given the target latency requirement, a URLLC transmission may need to puncture another lower priority transmission. As DL is controlled by a NodeB, the NodeB can schedule the URLLC transmission over and puncture lower priority transmission, such as one by an eMBB user and rely on outer code or other mechanisms to minimize impact to eMBB users. For UL, all UL assignments are scheduled well in advance and cannot be punctured "on the fly" (e.g., in an unscheduled manner). For example, a lower priority transmission, such as eMBB, may be transmitting from a first UE. If a second UE attempts to transmit a URLLC transmission during time the first UE is transmitting, the two transmissions may collide and result in interference. Accordingly, techniques allowing for co-existence of reliable low-latency services with other services in a wireless network are desirable.

Figure 7:
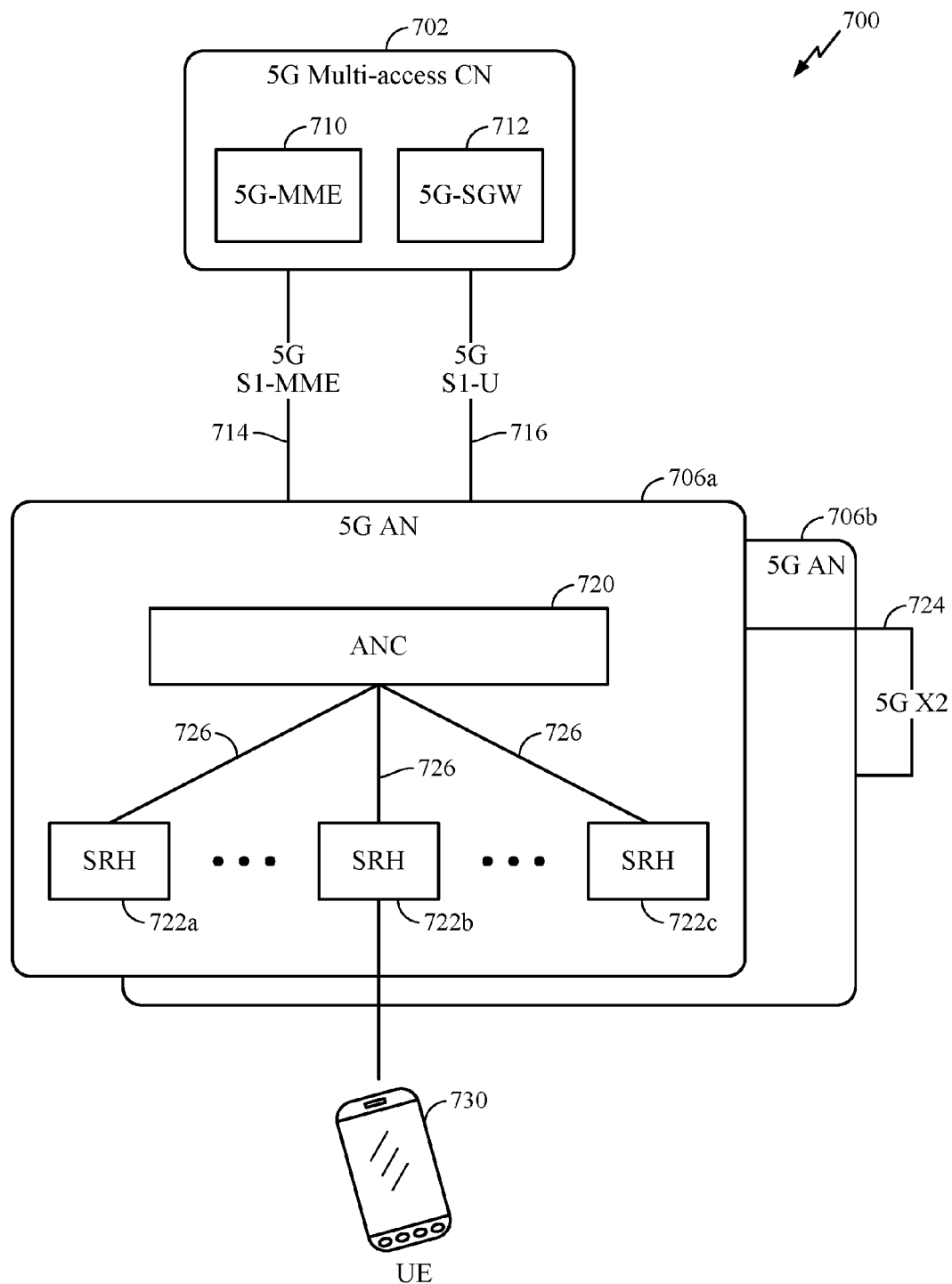
FIG. 7 illustrates an exemplary logical architecture of a 5G radio access network, according to previously known techniques.

FIG. 7 illustrates an exemplary logical architecture 700 of a 5G radio access network. The exemplary architecture includes a multi-access core network (CN) 702 and one or more 5G access networks 706a, 706b. The multi-access CN includes a mobility management entity (5G-MME) 710 and a 5G serving gateway (5G-SGW) 712. The 5G-MME may manage mobility and connections of the various UEs and other entities connecting to the RAN via a 5G S1 MME interface (S1-MME) 714. The 5G serving gateway may enable and manage connections to other networks (e.g., the Internet) for user plane data via a 5G S1 user interface (5G S1-U) 716. The 5G ANs 706 include an access node controller (ANC) 720 that is connected with a plurality of serving radio heads (SRHs) 722a, 722b, 722c. Serving radio heads may also be referred to as transmission and reception points (TRPs). The ANC terminates a backhaul interface to neighbor 5G-ANs, via a 5G X2 interface 724. One or more of the SRHs may serve wireless traffic to or from a UE 730. While the exemplary architecture shows only a single UE, the disclosure is not so limited, and applies to networks serving any number of UEs.

SRHs may be distributed over a geographical area, and each SRH may serve one or more cells. While not shown in FIG. 7, an SRH may be connected to one or more ANCs (e.g. for RAN sharing, radio resources as a service (RaaS), and service specific ANC deployments). Also, an ANC may be connected with only a single SRH in some cases. An SRH may advertise system information (e.g., a global SRH ID or TRP ID) and may include PDCP, RLC, and/or MAC functions. An SRH may comprise one or more antenna ports. An SRH may be configured to individually (dynamic selection) or jointly (joint transmission) serve traffic to a UE. An ANC may communicate with an SRH via an F1 interface 726.

According to previously known techniques, a wireless communications system may operate using DL based mobility, which is used in certain legacy designs (e.g., 4G LTE). In DL based mobility, a network entity (e.g., an eNB) sends reference signals on a periodic basis, and UEs perform cell search to connect with cells of the network, if necessary. A UE may perform cell search when the UE is unable to detect reference signals, or when reference signals detected by the UE do not allow the UE to identify cells with which the UE may connect (e.g., all detected cells only support a radio access technology that the UE does not support).

In UL based mobility systems, each UE may send reference signals, which may be referred to as chirps, and network entities perform cell search, if necessary. A network entity (e.g., a 5G MME) may cause a cell search for a UE to be performed when the network entity has data to deliver to the UE but does not have information on a cell which can communicate the data to the UE.

In such scenarios, DL based mobility systems typically cause a given UE to spend significant power on cell search and to wake up more frequently than UL based mobility. UL based mobility may improve UE battery life, if chirping uses less power than cell search and/or additional UE wakeups performed by a UE in DL based mobility scenarios. In addition, UL based mobility typically improves paging/handoff reliability.

UL based mobility systems may achieve improvements (e.g., versus DL based mobility systems) in energy efficiency and mobility for both UE and network by using differences in control plane activities, as follows. On the network side, energy may be saved by not requiring always-on signals, such as reference signals, for mobility to be supported. On the UE side, UE power consumption may be reduced by reducing frequent cell search operations and frequent access configuration changes. In addition, changes on both the UE and the network sides may enable new mobility scenarios, such as high speed train and/or ultra-dense deployment.

In UL based mobility systems, a UE doesn't measure cell specific signals for neighbor cells or the current serving cell. A single frequency network (SFN) transmission technique is one where identical copies of a signal are transmitted from a plurality of cells in a time synchronized fashion. An SFN signal then is a signal employing an SFN transmission technique. Instead of measuring cell specific signals (e.g., for neighbor cells or the current serving cell), the UE may measure an SFN SYNC signal. The UE may measure the SFN SYNC signal to determine if the UE is in the coverage of a cell participating in the SFN transmission of the signal. The set of cells participating in the transmission of the SFN SYNC signal may be referred to as a zone. In this case, the SFN SYNC signal may carry identifying information for the zone referred to as the zone ID (ZID). Since the UE keeps track of the SFN SYNC signal, the UE does not need to perform any cell specific measurements when moving across cell boundaries. If the UE observes the strength of the SFN SYNC signal to fall below a threshold, the UE may initiate certain actions, such as searching for other signals, either on the same or different frequencies, or searching for other radio access technologies (RATs), etc.

One or more of the cells may use a same access configuration, which may be referred to as a zone access configuration. An access configuration comprises information required to access the system by a UE. An access configuration for a device may be obtained, by the device, from information in broadcast signaling or dedicated signaling for the device, or a combination thereof. By having cells use the same access configuration (e.g., a zone access configuration), the network does not require a UE to acquire a cell specific access configuration in order to access the network when moving across cell boundaries. For UL based mobility, one or more cells in a zone may have the same access configuration. Then, upon first detecting an SFN SYNC signal for a cell in the zone, the UE acquires an access configuration referred to as a zone access configuration. Once the UE has acquired the zone access configuration and determined the SFN SYNC signal strength to be above a threshold, the UE may be said to be camped on the zone. As long as the UE is camped on the zone, the UE does not need to acquire a new access configuration when crossing cell boundaries within the zone. Cells that are not in a same zone may have a same access configuration.

In addition to the SFN SYNC signal, the UE may monitor a paging indicator channel (PICH), which may be transmitted from one or more cells within a zone. The PICH channel may be used to transmit a paging indication (PI) message, also referred to as a paging notification, to the UE, upon reception of which the UE initiates access to the system by transmitting on the access channel, e.g., when there is mobile terminated (MT) data and/or signaling traffic for the UE. Independently, the UE may initiate access to the system by transmitting on the access channel, e.g., when there is mobile originated (MO) data and/or signaling traffic at the UE. Upon reception of the paging indication message or when there is MO data and/or signaling, the UE may initiate access to the system using an access procedure in accordance with the zone access configuration. A transmission associated with the access procedure (e.g., an access transmission from the UE) may be received by any of the cells sharing the zone access configuration. Based on the cells receiving the access transmission, the network may decide upon and indicate (e.g., in a transmission from one or more cells) the cell to be used for subsequent data and/or signaling traffic exchange with the UE. The channel carrying this indication is referred to as the Physical Cell ID channel (PCICH). The UE may retransmit the access transmission if the UE does not receive a response from the network. The network (e.g., a 5G MME) may decide on the cell to be used for exchanging signaling with the UE based on one or more transmissions from the UE and may subsequently change the cell, i.e., handover, based on further measurements reported by the UE and/or based on measurements at the network. Such measurements may be made, for example, once the access procedure is complete and a connection between the UE and the network has been established.

According to aspects of the present disclosure, all of the cells in a zone may be time synchronized for receiving the access transmission, so that the UE does not need to perform multiple access transmissions with different timings in order for different cells to be able to receive the transmission.

To achieve the same coverage with the PICH as with the SFN SYNC signal, the network may transmit the PICH using SFN techniques (e.g., a plurality of cells transmit an identical signal simultaneously). The PICH may be addressed to specific UE(s), and SFN transmission of this channel may create excessive load on the network. To avoid this problem, the network may configure the UE to transmit on the uplink access channel during certain occasions, e.g. semi-statically configured periodic occasions, even in the absence of MO data traffic, MO signaling traffic, and/or a paging indication message. Such semi-statically configured periodic transmissions on the uplink access channel may also use the zone access configuration and may be referred to as uplink mobility indication (UMI) transmissions. Based on received UMI transmissions, the network may be able to isolate and/or narrow down the UE location and transmit PICH in a localized manner, i.e., from one or more cells in the vicinity of the UE. Such localized transmission may employ techniques such as power boosting or localized SFN transmission, as opposed to SFN transmission across the entire zone, to ensure high reliability can be achieved for the PICH channel. Further, the UE may optionally be configured to receive a keep-alive (KA) message. Such a KA message could be sent on PICH periodically or in response to transmissions on the uplink from the UE. If the UE is configured but not able to receive the KA message after a certain number of trials or a duration (e.g., a duration in a configuration received from the network), the UE may initiate actions such as searching for other signals on either the same or different frequencies and/or searching for different RATs. According to aspects of the present disclosure, a KA message may be transmitted on a same channel as PICH or on a different channel than PICH.

Figure 8:
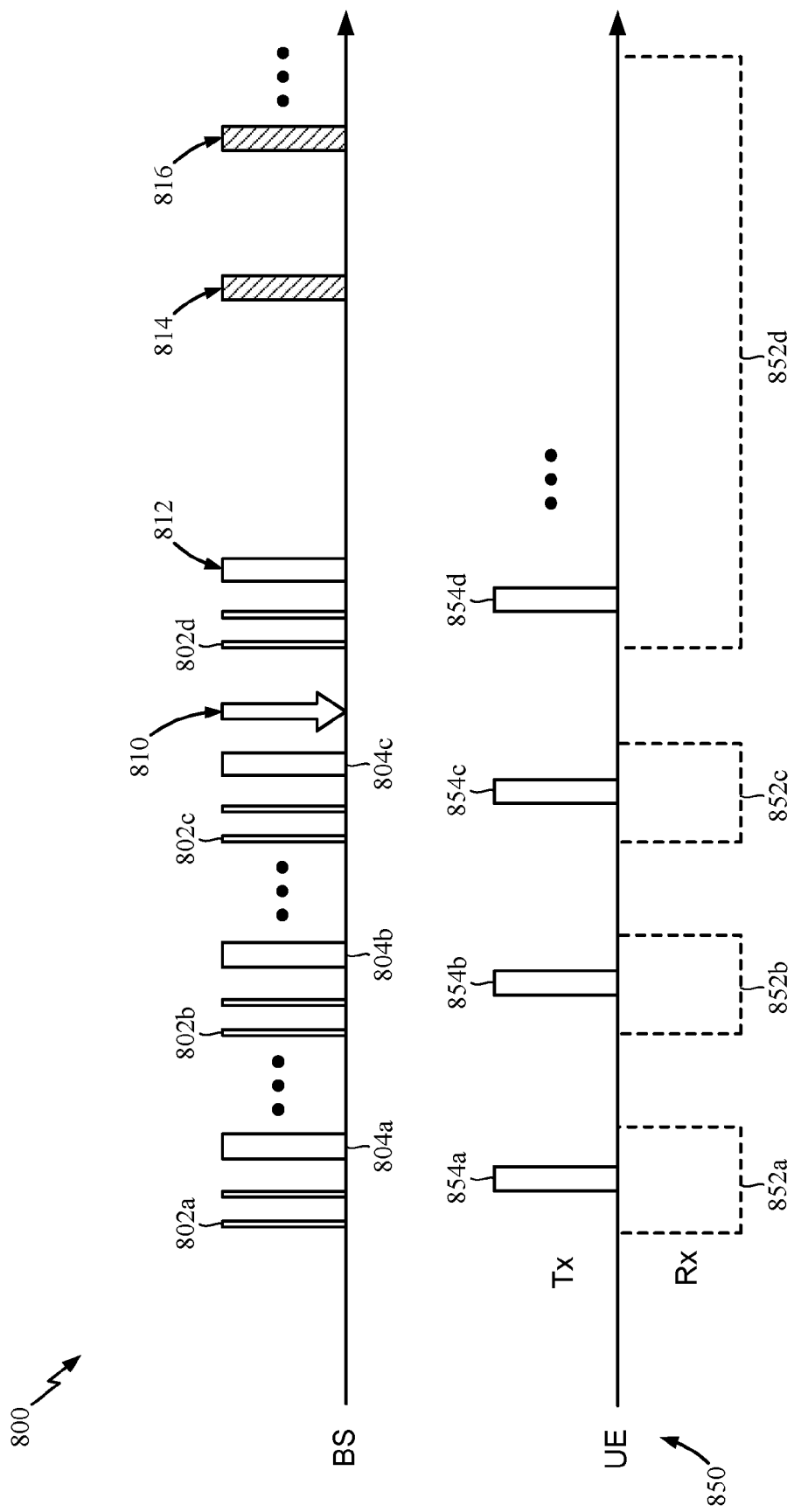
FIG. 8 illustrates exemplary transmission timelines for a BS and a UE operating according to aspects of the present disclosure.

FIG. 8 shows exemplary transmission timelines 800, 850 for a BS (e.g., SRH 722b, shown in FIG. 7) and a UE (e.g., UE 730, shown in FIG. 7) operating in an UL based mobility system, according to aspects of the present disclosure. In timeline 800, the BS periodically transmits SFN SYNC signals, as discussed above, at 802a, 802b, 802c, and 802d. Meanwhile, the UE periodically wakes up to measure the SFN SYNC signal and to receive KA signals and the PICH, as discussed above and shown in transmission timeline 850 at 852a, 852b, 852c, and 852d. The UE may also send UMI transmissions, as discussed above, at 854a, 854b, 854c, and 854d. When the BS (or another network entity) receives a UMI, the BS (or other network entity) transmits a KA message, as discussed above and shown at 804a, 804b, and 804c. In addition, the network (e.g., a control unit of the network) may obtain the UMI transmissions (e.g., from one or more BSs) and track the location of the UE, based on which BSs receive the UMI transmissions and possibly on measurements of the signal strengths of the UMI transmissions.

At 810, data arrives at the BS for transmission to the UE. The BS waits until a time when the UE will be monitoring for KA signals and/or paging notification signals and transmits a paging notification message, instead of or in addition to a KA signal, at 812. In case there is no page indication (e.g., a paging notification) for the UE, the UE shuts off its receiver until the next periodic occasion, as shown at 852a, 852b, and 852c. If a page indication message is received, such as the paging notification message at 812, the UE may keep the receiver of the UE active past the end of the DRX active period. The BS may determine (e.g., based on signal strength of a UMI or in response to a command from another network entity) to transmit the data to the UE. The BS may transmit a cell ID of a serving cell on the PCICH of the UE, as well as other transmissions to cause the UE and BS to be connected, at 814. The UE receives the cell ID on the PCICH and is able to connect to the BS. When the BS and the UE are connected, the BS transmits the data and/or other signaling for the UE at 816.

Example Triggers for User Equipment Transmissions to Support Uplink Based Mobility As mentioned above and described in more detail below, aspects of the present disclosure provide techniques for triggering UE transmissions to support uplink based mobility in a wireless communication system, such as a new radio (NR) (e.g., 5G) system.

As described previously, a UE may transmit on an uplink access channel in an uplink based mobility wireless communication system. The UE may receive (e.g., from a BS) a configuration (e.g., an access configuration, a zone access configuration) indicating one or more triggers for the UE to transmit on the uplink access channel. The triggers may include one or more of a timer (e.g., expiration of a timer), a downlink signal strength (e.g., strength of a measurement reference signal (MRS) for a zone), an estimate of downlink load, an estimate of uplink load, and an estimate of distance traveled by the UE since a last uplink transmission.

Figure 9:
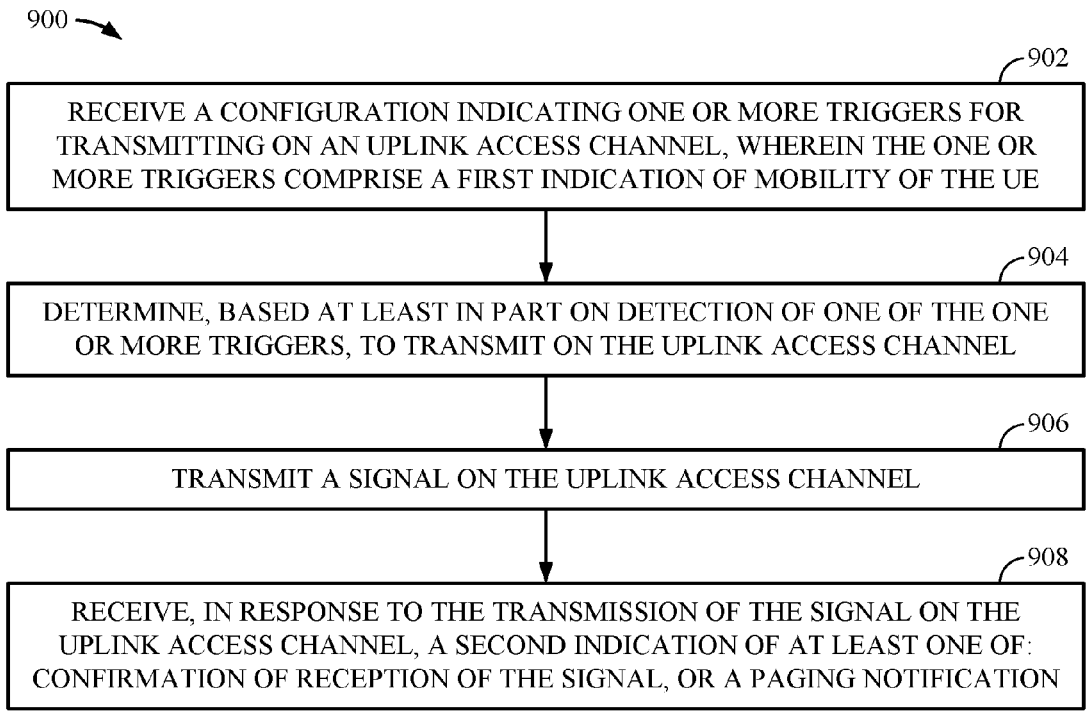
FIG. 9 illustrates example operations for wireless communications by a user equipment (UE), according to aspects of the present disclosure.
Figure 9A:
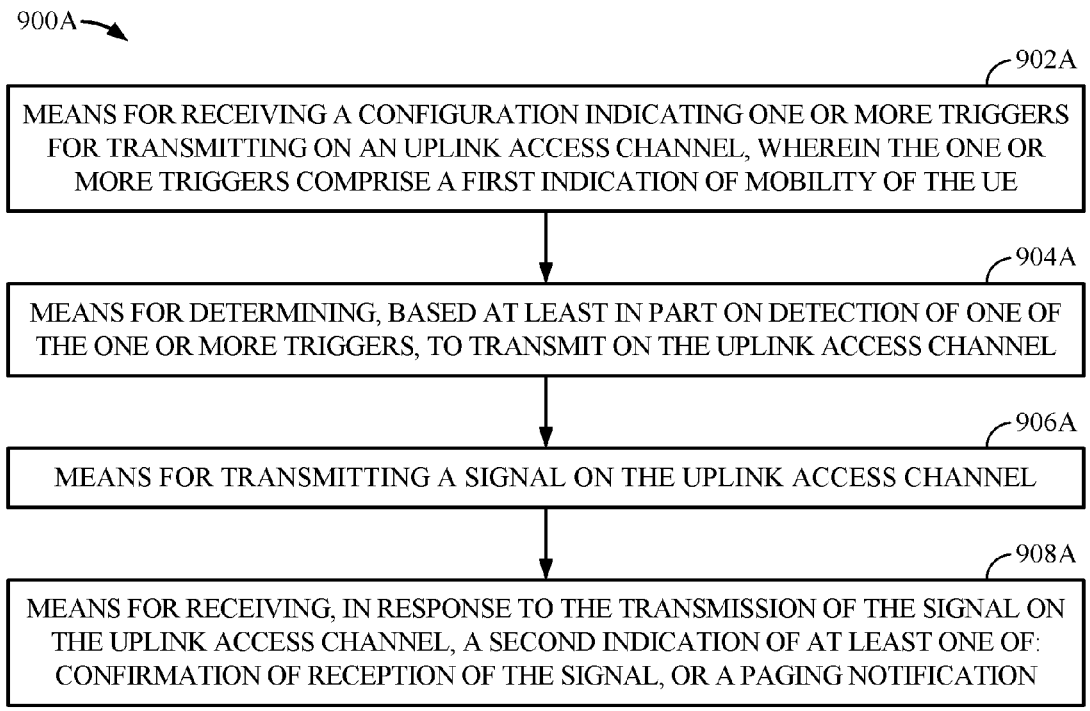
FIG. 9A illustrates example means capable of performing the operations shown in FIG. 9.

FIG. 9 illustrates example operations 900 for wireless communications by a user equipment (UE), according to aspects of the present disclosure. The operations 900 may be performed, for example, by UE 120, shown in FIG. 1 and/or UE 730, shown in FIG. 7.

Operations 900 may begin at 902 by the UE receiving a configuration indicating one or more triggers for transmitting on an uplink access channel, wherein the one or more triggers comprise a first indication of mobility of the UE. For example, UE 730 (shown in FIG. 7) may receive a configuration (e.g., a zone access configuration) from SRH 722b, shown in FIG. 7, indicating the UE should transmit on an uplink access channel if an estimate of a distance traveled by the UE, since the UE last transmitted an uplink signal, is greater than or equal to a threshold distance.

At 904, the UE determines, based at least in part on the configuration, to transmit on the uplink access channel. Continuing the example from above, the UE may determine that the UE has traveled a distance greater than the threshold distance since the UE transmitted data for a voice call and determine to transmit a UMI signal on the uplink access channel.

At 906, the UE transmits a signal on the uplink access channel. Continuing the example from above, the UE transmits the UMI signal, according the zone access configuration.

At 908, the UE, receives, in response to the transmission of the signal on the uplink access channel, a second indication of at least one of: confirmation of reception of the signal, or a paging notification. Continuing the example above, the UE receives an acknowledgment confirming reception of the UMI signal from SRH 722c (shown in FIG. 7).

Figure 10:
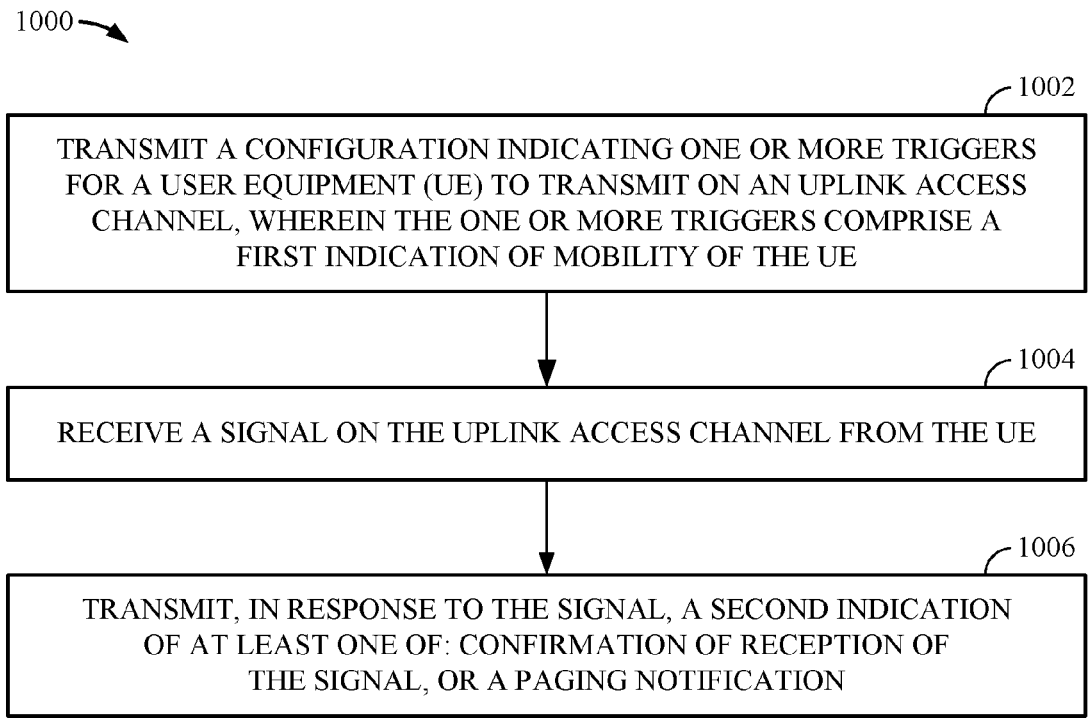
FIG. 10 illustrates example operations for wireless communications by a wireless node, according to aspects of the present disclosure.
Figure 10A:
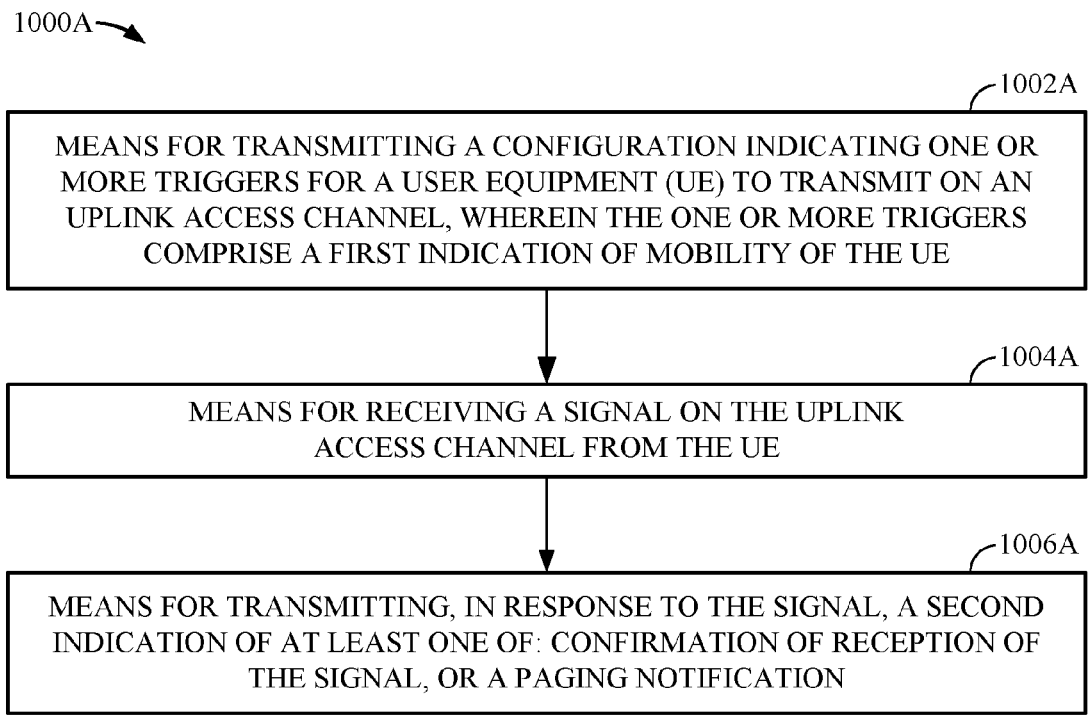
FIG. 10A illustrates example means capable of performing the operations shown in FIG. 10.

FIG. 10 illustrates example operations 1000 for wireless communications by a wireless node, according to aspects of the present disclosure. The operations 1000 may be performed by a SRH (e.g., a TRP) or a base station, for example, BS 110 shown in FIG. 1 or SRH 722b shown in FIG. 7, and may be considered complementary to the operations 900 shown in FIG. 9.

Operations 1000 may begin at 1002 by the BS transmitting a configuration indicating one or more triggers for a user equipment (UE) to transmit on an uplink access channel, wherein the one or more triggers comprise a first indication of mobility of the UE. For example, SRH 722b (shown in FIG. 7) may transmit a zone access configuration to UE 730 (shown in FIG. 7) indicating that the UE should transmit on an uplink access channel if an estimate of a distance traveled by the UE, since a last uplink transmission by the UE, is greater than or equal to a threshold.

At 1004, the BS receives a signal on the uplink access channel from the UE. Continuing the example, the SRH receives a UMI signal on the uplink access channel from the UE.

At 1006, the BS transmits, in response to the signal, an indication of at least one of confirmation of reception of the signal and a paging notification. Continuing the example above, the SRH transmits an acknowledgment confirming reception of the UMI signal.

Figure 11:
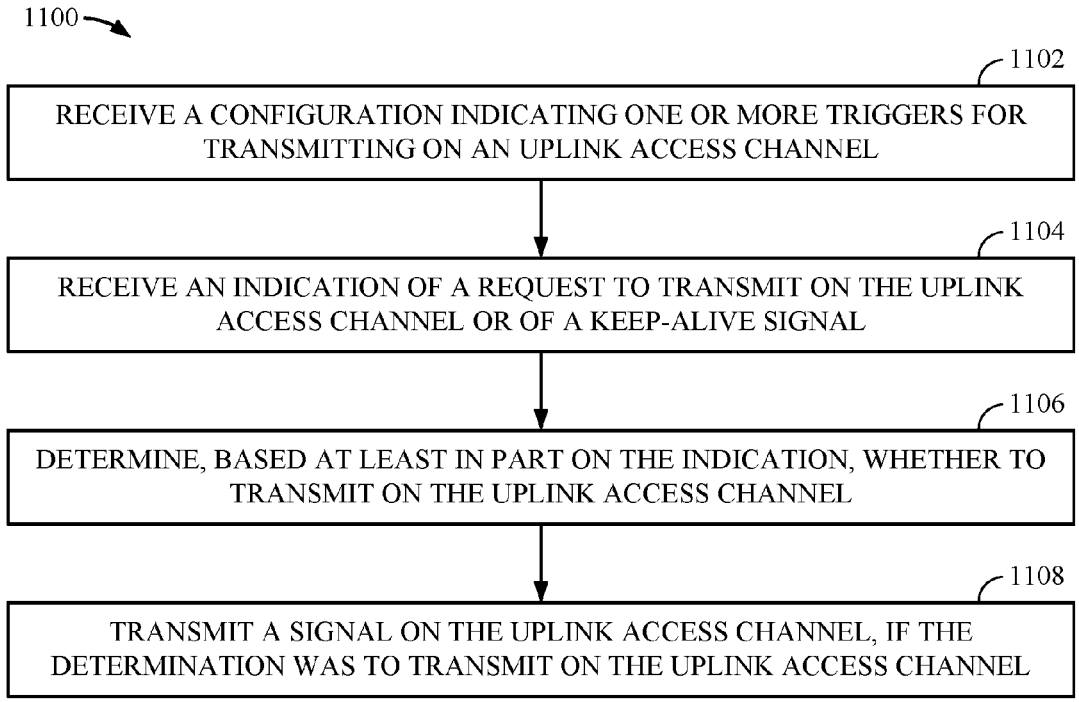
FIG. 11 illustrates example operations for wireless communications by a user equipment (UE), according to aspects of the present disclosure.
Figure 11A:
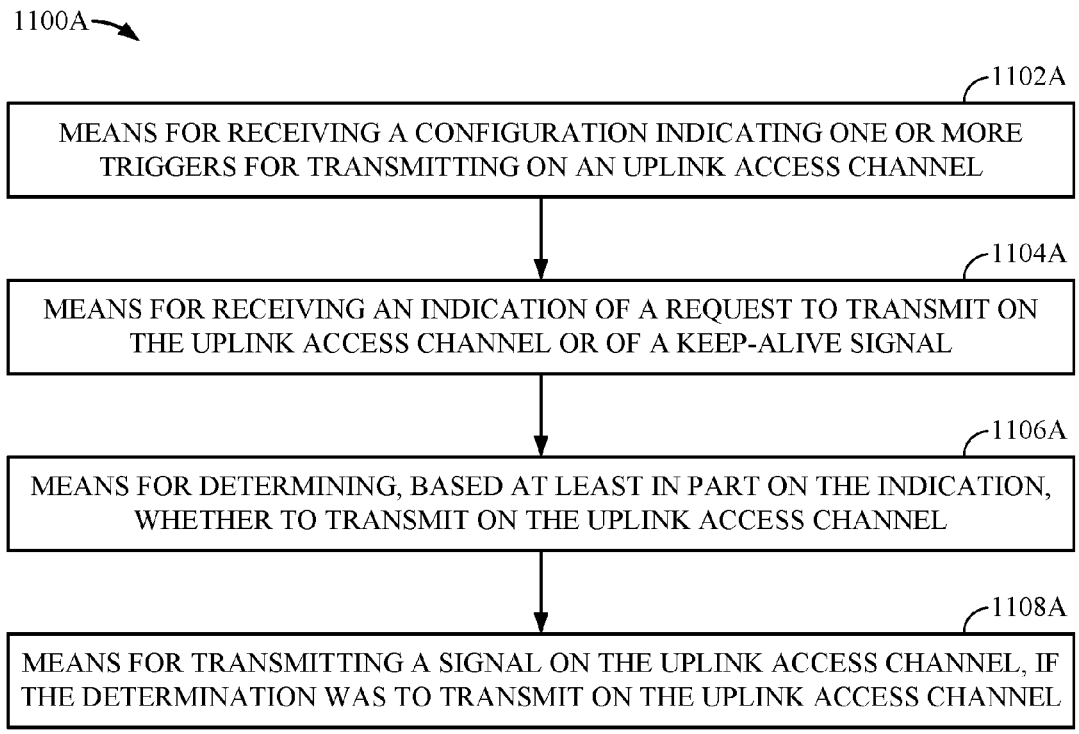
FIG. 11A illustrates example means capable of performing the operations shown in FIG. 11.

FIG. 11 illustrates example operations 1100 for wireless communications by a user equipment (UE), according to aspects of the present disclosure. The operations 1100 may be performed, for example, by UE 120, shown in FIG. 1, or UE 730, shown in FIG. 7.

Operations 1100 may begin at 1102 by the UE receiving a configuration indicating one or more triggers for transmitting on an uplink access channel. For example, UE 730 (shown in FIG. 7) may receive a configuration (e.g. an access configuration) from SRH 722a (shown in FIG. 7) indicating a set of triggers for transmitting on an uplink access channel. In the example, the triggers may include an estimate of a distance traveled by the UE since a last uplink transmission by the UE, an expiration of a timer, a measurement of downlink signal strength (e.g., reference signal received power (RSRP)) being less than or equal to a first threshold, an estimate of downlink load being greater than or equal to a second threshold, an estimate of uplink load (e.g., uplink load on a cell) being greater than or equal to a third threshold, and/or an estimate of power consumption by the UE.

At 1104, the UE receives an indication of a request to transmit on the uplink access channel or of a keep-alive signal. Continuing the example above, the UE may receive a keep-alive signal from the SRH.

At 1106, the UE determines, based at least in part on the indication, whether to transmit on the uplink access channel.

Continuing the example above, the UE determines, in response to and based on the keep-alive signal, that a measurement of downlink signal strength is less than a first threshold in the configuration and determines to transmit a UMI signal on the uplink access channel.

At 1108, the UE transmits a signal on the uplink access channel, if the determination was to transmit on the uplink access channel. Continuing the example above, the UE transmits the UMI signal on the uplink access channel.

Figure 12:
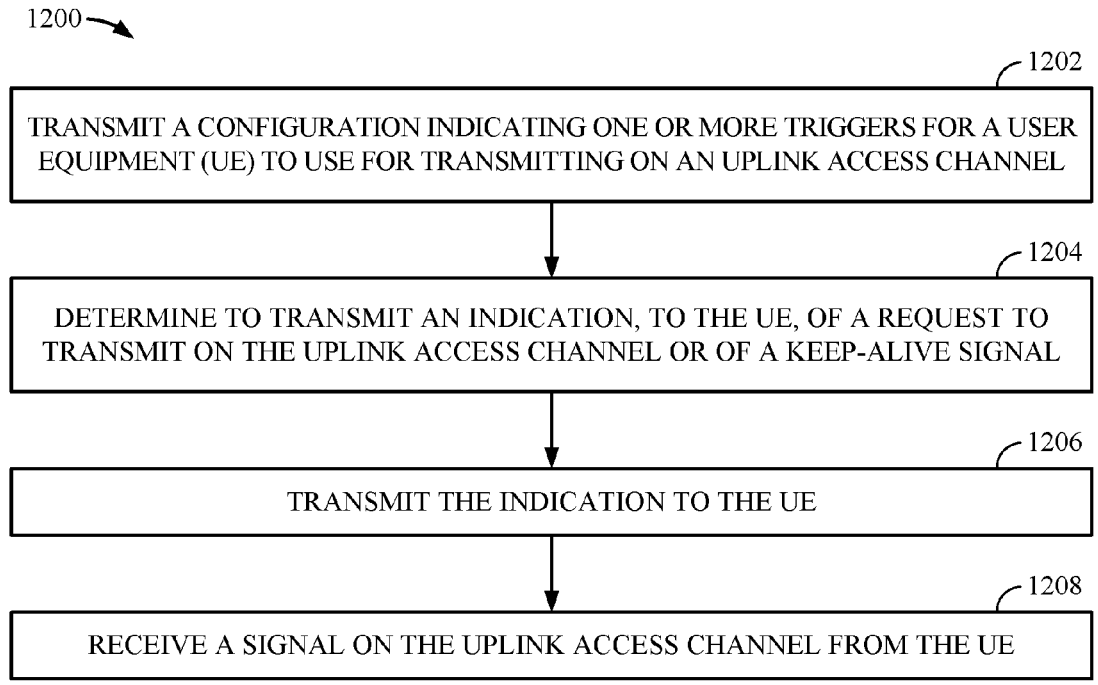
FIG. 12 illustrates example operations for wireless communications by a wireless node, according to aspects of the present disclosure.
Figure 12A:
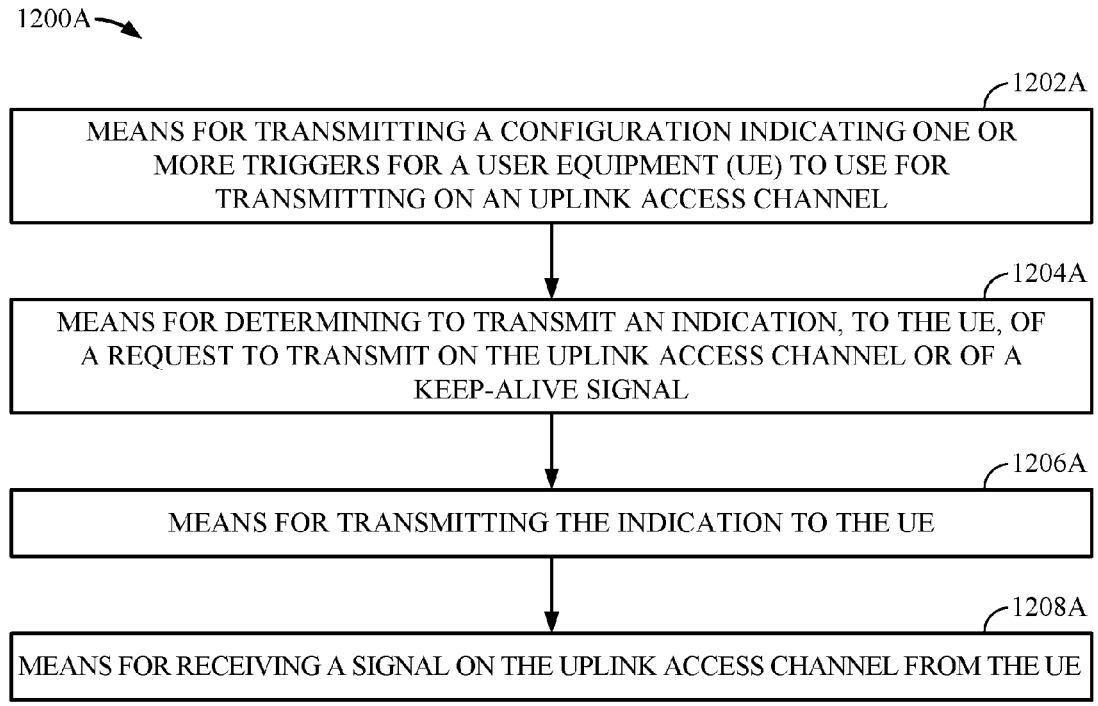
FIG. 12A illustrates example means capable of performing the operations shown in FIG. 12.

FIG. 12 illustrates example operations 1200 for wireless communications by a wireless node, according to aspects of the present disclosure. The operations 1200 may be performed by a SRH (e.g., a TRP) or a base station, for example, BS 110 shown in FIG. 1 or SRH 722b shown in FIG. 7, and may be considered complementary to the operations 1100 shown in FIG. 11.

Operations 1200 may begin at 1202 by the BS transmitting a configuration indicating one or more triggers for a user equipment (UE) to use for transmitting on an uplink access channel. For example, SRH 722b transmits a configuration (e.g., a zone access configuration) indicating a set of triggers for UE 730 (shown in FIG. 7) to transmit on an uplink access channel. In the example, the triggers may include an estimate of a distance traveled by the UE since a last uplink transmission by the UE, an expiration of a timer, a measurement of downlink signal strength (e.g., reference signal received power (RSRP)) being less than or equal to a first threshold, an estimate of downlink load being greater than or equal to a second threshold, an estimate of uplink load (e.g., uplink load on a cell) being greater than or equal to a third threshold, and/or an estimate of power consumption by the UE.

At 1204, the BS determines to transmit an indication, to the UE, of a request to transmit on the uplink access channel or of a keep-alive signal. Continuing the example, the SRH determines (e.g., based on a DRX cycle of the UE) to transmit a keep-alive signal to the UE.

At 1206, the BS transmits the indication to the UE. Continuing the example, the SRH transmits the KA signal to the UE.

At 1208, the BS receives a signal on the uplink access channel from the UE. Continuing the example, the SRH receives a UMI signal from the UE on the uplink access channel.

Figure 13:
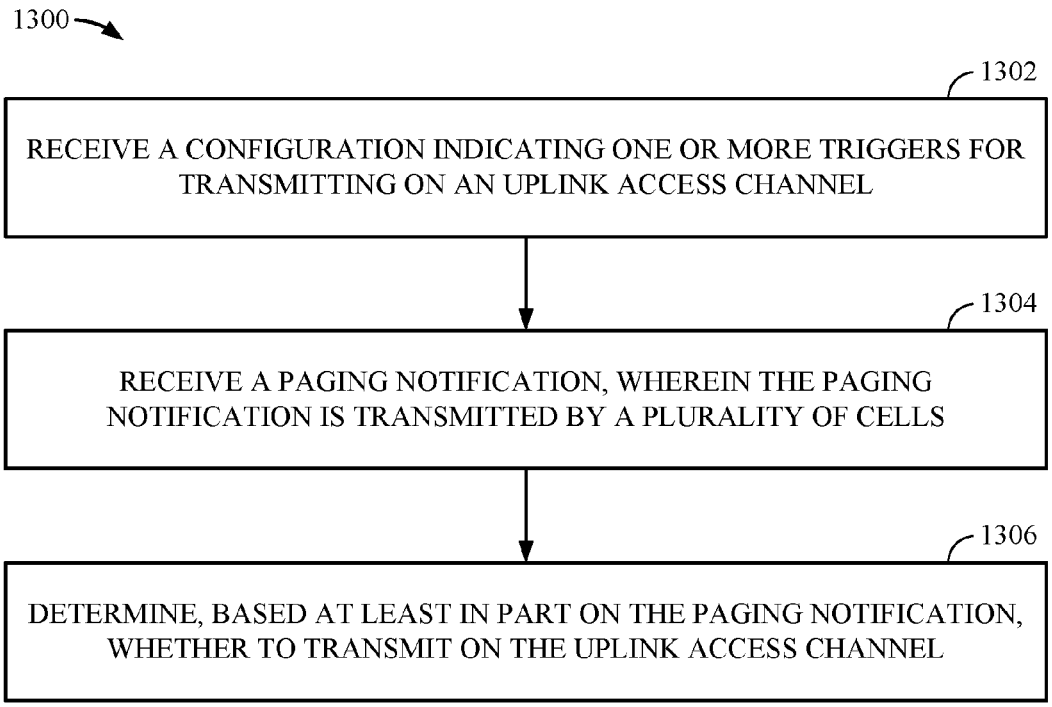
FIG. 13 illustrates example operations for wireless communications by a user equipment (UE), according to aspects of the present disclosure.
Figure 13A:
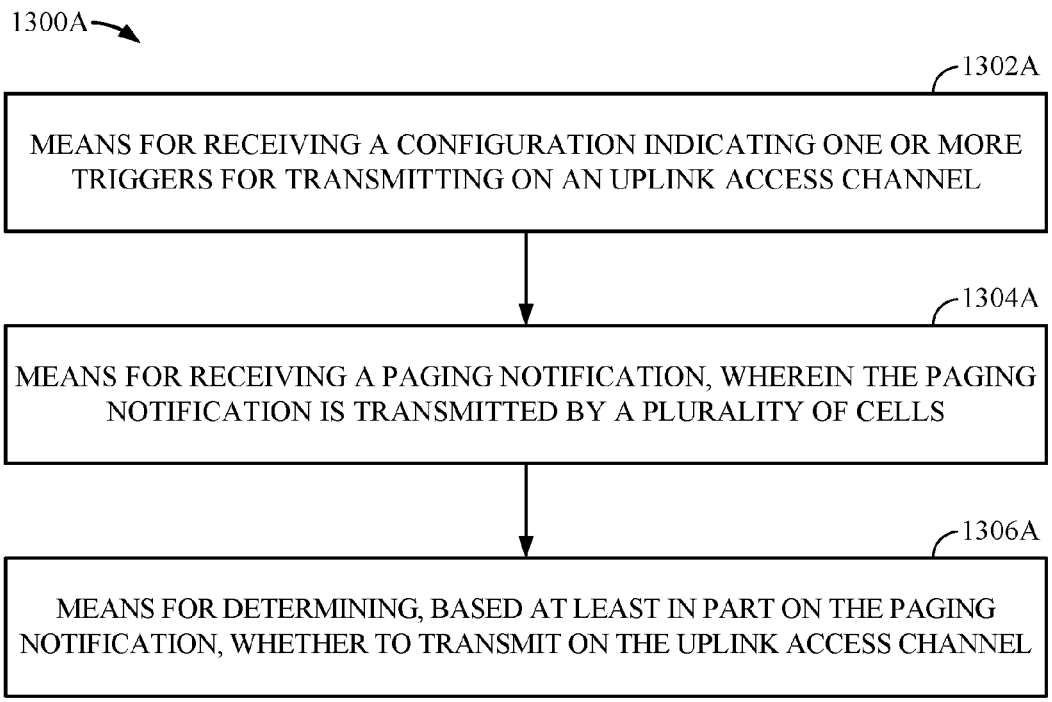
FIG. 13A illustrates example means capable of performing the operations shown in FIG. 13.

FIG. 13 illustrates example operations 1300 for wireless communications by a user equipment (UE), according to aspects of the present disclosure. The operations 1300 may be performed, for example, by UE 120, shown in FIG. 1 or UE 730, shown in FIG. 7.

Operations 1300 may begin at 1302 by the UE receiving a configuration indicating one or more triggers for transmitting on an uplink access channel. For example, UE 730 may receive a configuration (e.g., an access configuration) from SRH 722b (shown in FIG. 7) indicating a set of triggers to transmitting on an uplink access channel. In the example, the triggers may include an estimate of a distance traveled by the UE since a last uplink transmission by the UE, an expiration of a timer, a measurement of downlink signal strength (e.g., reference signal received power (RSRP)) being less than or equal to a first threshold, an estimate of downlink load being greater than or equal to a second threshold, an estimate of uplink load (e.g., uplink load on a cell) being greater than or equal to a third threshold, and/or an estimate of power consumption by the UE.

At 1304, the UE receives a paging notification, wherein the paging notification is transmitted by a plurality of cells. Continuing the example, the UE receives a paging notification including an identifier of the UE from SRH 722*b*, wherein the paging notification was also transmitted by SRH 722*a* and SRH 722*c*.

At 1306, the UE determines, based at least in part on the paging notification, whether to transmit on the uplink access channel. Continuing the example, the UE decodes the paging notification, determines that an identifier of the UE was included in the paging notification, and determines to transmit a UMI signal on the uplink access channel.

Figure 14:
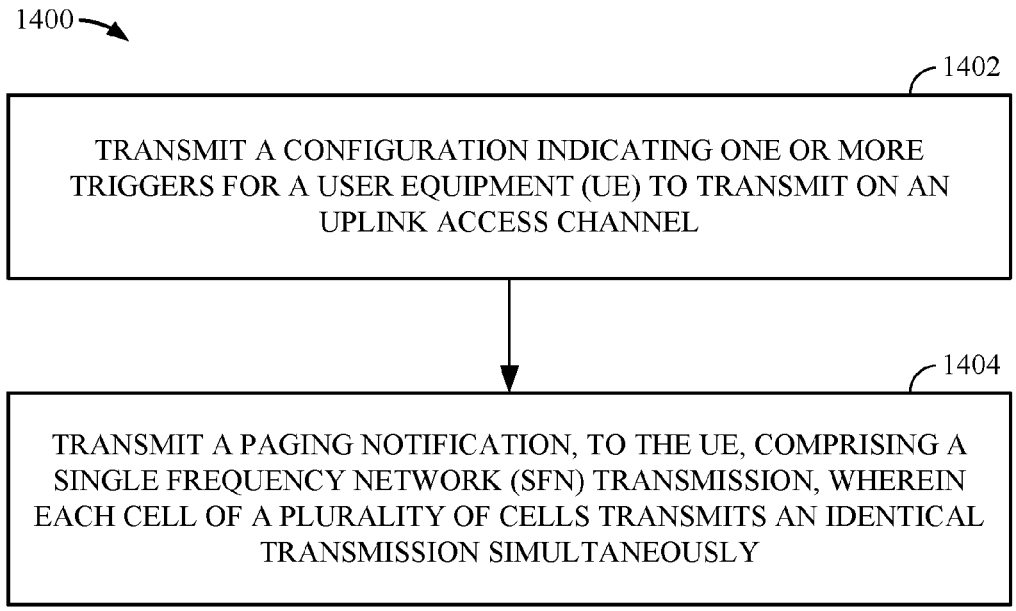
FIG. 14 illustrates example operations for wireless communications by a wireless node, according to aspects of the present disclosure.
Figure 14A:
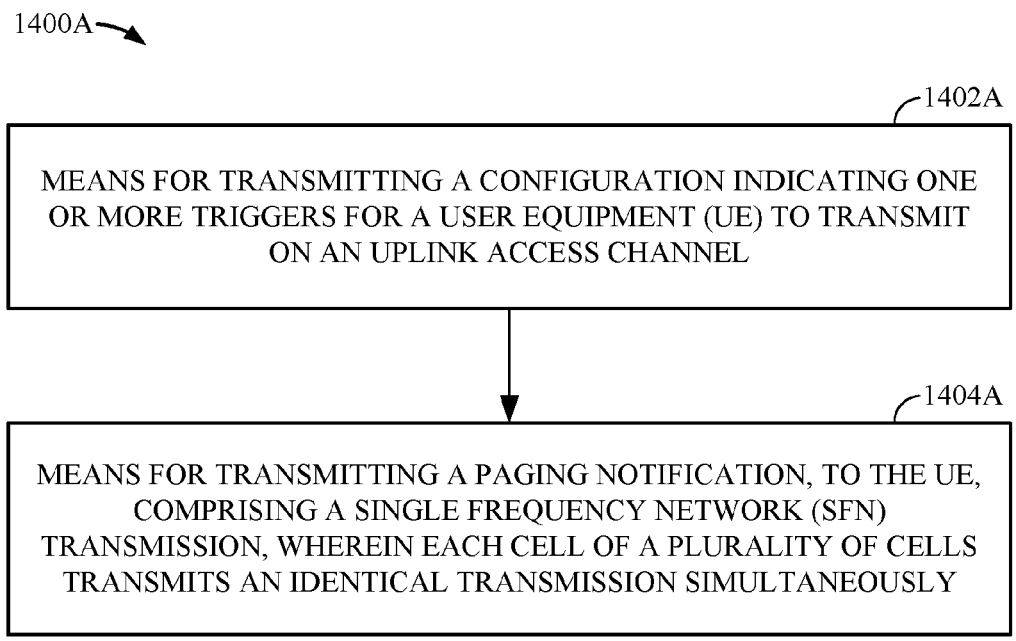
FIG. 14A illustrates example means capable of performing the operations shown in FIG. 14.

FIG. 14 illustrates example operations 1400 for wireless communications by a wireless node, according to aspects of the present disclosure. The operations 1400 may be performed by a SRH (e.g., a TRP) or a base station, for example, BS 110 shown in FIG. 1 or SRH 722*b* shown in FIG. 7, and may be considered complementary to the operations 1300 shown in FIG. 13.

Operations 1400 may begin at 1402 by the BS transmitting a configuration indicating one or more triggers for a user equipment (UE) to transmit on an uplink access channel. For example, SRH 722*b* may transmit a configuration (e.g., a zone access configuration) indicating a set of triggers for UE 730 (shown in FIG. 7) to transmit on an uplink access channel. In the example, the triggers may include an estimate of a distance traveled by the UE since a last uplink transmission by the UE, an expiration of a timer, a measurement of downlink signal strength (e.g., reference signal received power (RSRP)) being less than or equal to a first threshold, an estimate of downlink load being greater than or equal to a second threshold, an estimate of uplink load (e.g., uplink load on a cell) being greater than or equal to a third threshold, and/or an estimate of power consumption by the UE.

At 1404, the BS transmits a paging notification, to the UE, comprising a single frequency network (SFN) transmission, wherein each cell of a plurality of cells transmits an identical transmission simultaneously. Continuing the example, the SRH 722*b* may transmit a paging notification to UE 730 at the same time that SRH 722*a* and SRH 722*c* transmit identical paging notifications to UE 730. In the example, ANC 720 may coordinate (e.g., using a scheduling algorithm) SRH 722*a*, SRH 722*b*, and SRH 722*c* to transmit the identical paging notifications simultaneously.

According to aspects of the present disclosure, a BS (e.g., an SRH, a TRP) may transmit a single frequency network (SFN) synchronization (SYNC) signal simultaneously with one or more other BSs. Each BS in a zone may transmit an identical SFN SYNC signal, which may also be referred to as a zone sync signal. A UE operating according to UL based mobility, as mentioned previously, may receive the zone sync signal and determine that the UE is in a zone. A zone may comprise a number of Smart Radio Heads (SRHs) controlled by an Access Network Controller (ANC). A zone is typically associated with a geographical area, and a UE may move about the area without leaving the zone.

Figure 15:
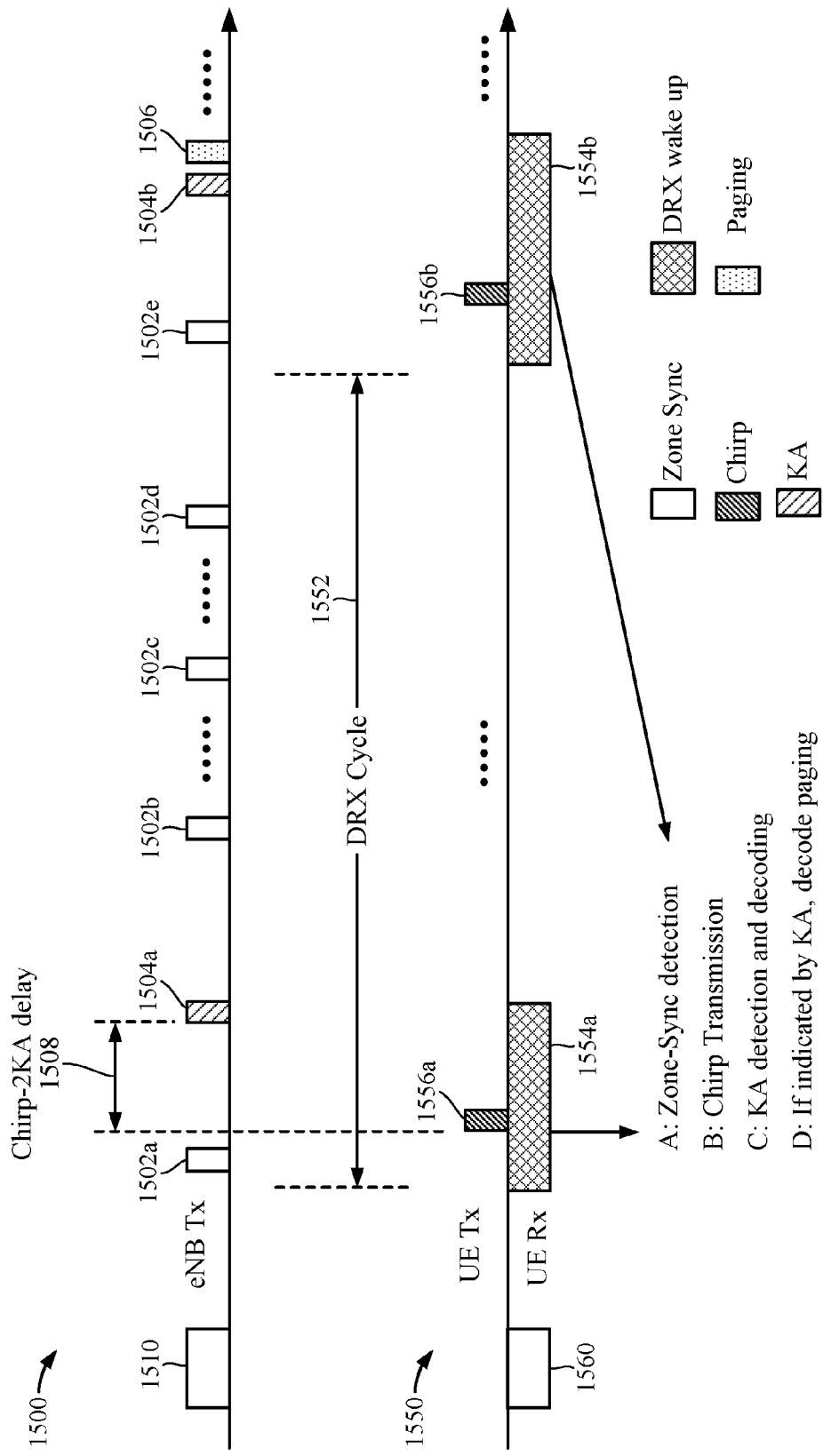
FIG. 15 illustrates exemplary transmission timelines of a BS and a UE operating according to aspects of the present disclosure.

FIG. 15 illustrates exemplary transmission timelines 1500, 1550 of a BS (e.g., SRH 722*b*, shown in FIG. 7) and a UE (e.g., UE 730 shown in FIG. 7) operating according to aspects of the present disclosure. As described above with reference to FIGS. 10, 12, and 14, at 1510, the BS transmits a configuration indicating one or more triggers for the UE to use for transmitting on an uplink access channel. As described above with reference to FIGS. 9, 11, and 13, at 1560, the UE receives the configuration (transmitted by the BS) indicating one or more triggers for transmitting on an uplink access channel. The UE may be operating in a discontinuous reception (DRX) manner when receiving the configuration or may begin operating with DRX after receiving the configuration. A DRX cycle length of the DRX cycle of the UE is shown at 1552. The BS transmits a zone synchronization signal 1502*a*, 1502*b*, 1502*c*, 1502*d*, 1502*e*, on a periodic basis. The BS may transmit a zone sync signal that is identical to zone sync signals (not shown) transmitted by other BSs in the same zone as the BS, in which case the zone sync signals may also be referred to as SFN SYNC signals.

The UE wakes up and activates a receiver once per DRX cycle, as shown at 1554*a*, 1554*b*. While the receiver of the UE is active, the UE may measure a zone measurement reference signal (MRS), if the zone (e.g., one or more BSs) transmits zone MRS (MRS-z). The UE may also detect one or more of the zone sync signals. The UE may determine, based on the configuration and as described above with reference to FIG. 9, to transmit on the uplink access channel in response to detecting a zone sync signal. Additionally or alternatively, the measurement of one or more MRS-z being equal to or below a threshold (e.g., the UE has traveled away from the zone) may trigger the UE to transmit on the uplink access channel. If the UE does determine to transmit on the uplink access channel, then the UE may transmit, on the uplink access channel, a "chirp" signal, 1556*a*, 1556*b*. A chirp signal may also be referred to as an uplink mobility indicator (UMI) signal. The chirp signal is an example of transmitting on the uplink access channel, as described above with reference to FIGS. 9, 11, and 13. The chirp signal may be a contention based transmission, with multiple UEs transmitting on time and frequency resources with the possibility of two (or more) UEs simultaneously transmitting on the same frequency and interfering with each other. Additionally or alternatively, UEs may be configured to transmit chirp signals via a contentionless technique, wherein each UE of a plurality of UEs transmits a chirp orthogonally to any other UE transmitting a chirp, and none of the chirps by the UEs interferes with any other chirp. For example, UEs may use an algorithm dependent on a globally unique identifier (GUID) to determine transmission resources to use for the chirp, so that any two chirps will be orthogonal.

If the BS receives the chirp, then the BS may transmit a keep-alive (KA) signal 1504*a*, 1504*b*. Receiving the chirp is an example of receiving a signal on the uplink access channel from the UE, as described above with reference to FIGS. 10 and 12. The BS may transmit the KA signal a fixed period of time after receiving the chirp signal, known as a "chirp-to-keep-alive delay" or "chirp-2KA delay" 1508. The chirp-2KA delay may be indicated to the UE as part of the configuration indicating one or more triggers for the UE to use for transmitting on the uplink access channel and/or as part of a DRX configuration for the UE. The chirp-2KA delay may be determined based on network (e.g., fronthaul or backhaul) transmission times to other BSs, so that multiple BSs may transmit the KA signal as an SFN signal (see below with regard to paging notifications in KA signals). Transmitting the KA signal is an example of transmitting an indication of confirmation of reception of the (chirp) signal, as described above with reference to FIG. 10. Transmitting the KA signal is also an example transmitting an indication of a keep-alive signal, as described above with reference to FIG. 12.

If the BS has data to deliver to the UE or needs to connect with the UE for another reason, then the BS may include a paging notification in the KA signal. If the BS includes a paging notification in the KA signal, then transmitting the KA signal is an example of transmitting an indication of a paging notification, as described above with reference to FIGS. 10 and 14. As with the zone sync signals, the KA signal may be transmitted by the BS in unison with BSs as an SFN signal. The BS may then transmit a paging signal 1506. If the KA signal does include an indication of a paging notification, then the UE may determine to attempt to receive and decode a paging transmission from the BS. Attempting to receive and decode a paging transmission may include keeping a receiver of the UE active for a longer period of time than indicated by a DRX configuration of the UE.

In a typical UL based mobility (mentioned above) 5G wireless communication system, an ANC decides which eNB (i.e., SRH) will send a KA signal (e.g., in response to a chirp signal). A subset of SRHs controlled by the ANC may monitor a UE's chirp and may send one or more measurement reports to the ANC. The subset of SRHs may be referred to as a monitoring set. According to aspects of the present disclosure, if a measurement by an SRH is equal to or greater than a first threshold, then the SRH may send a KA to the UE without the ANC's involvement. According to aspects of the present disclosure, if the measurement by an SRH that last served a UE is equal to or below a second threshold, then the SRH may notify the ANC, which may select a new serving SRH for the UE that will send a KA to the UE.

According to aspects of the present disclosure, ANC involvement in determining an SRH to send a KA may increase a delay between the UE sending the chirp and an SRH transmitting the KA, e.g., if the network front-haul (connections between ANC and SRHs) is not using fiber, then there may be a few (e.g., two) millisecond added delay.

According to aspects of the present disclosure, a UE may transmit a chirp signal only when the UE misses a KA and/or paging notification signal during a DRX period. In an UL based mobility communication system, BSs may send KA and/or paging notification signals on a periodic basis, rather than in response to receiving chirps from UEs. Transmitting chirps consumes power of UEs. Because most UEs are stationary or moving relatively slowly, serving cells for such UEs do not change often, and hence there is no need for most UEs (e.g., the stationary or slowly moving UEs) to chirp frequently. On each DRX cycle, a UE wakes up and tries to detect a KA signal and/or a paging notification signal.

According to aspects of the present disclosure, a UE may switch from a first state, wherein the UE periodically transmits signals (e.g. chirps) on the uplink access channel as described above with reference to FIG. 8, to a second state wherein the UE does not periodically transmit the signals on the uplink access channel but instead transmits the signal on the uplink access channel in response to detection of a trigger in a configuration, such as failing to detect a KA alive signal, as described above.

According to aspects of the present disclosure, KA and/or paging notifications may be SFN signals and/or sent via multiple cells, and hence very reliable. If the UE detects a KA signal and/or a paging notification signal successfully, then the UE does not transmit a chirp. The UE may either: go back to sleep until a next DRX cycle, if the UE is not paged; or decode a PCICH channel to identify a serving cell and connect to the identified cell, if the UE is paged. If a UE fails to detect a KA signal and/or a paging notification signal (implying the UE has changed cells), then the UE may send a chirp. Not transmitting a chirp when the UE detects a KA signal and/or a paging notification signal may allow a UE to conserve power as compared to the UE transmitting a chirp after detecting a KA signal and/or a paging notification signal in each DRX cycle.

According to aspects of the present disclosure, a UE can also measure Zone Sync or MRS-z signals to determine a zone measurement. If a zone measurement by the UE is equal to or lower than a threshold, then the UE may transmit a chirp.

According to aspects of the present disclosure, the network may update a serving cell of a UE based on a chirp received from the UE. The network may then send a KA signal, which may be a second KA signal intended for the UE, and/or a paging notification signal to the UE. The UE may wait in the current DRX cycle (e.g., keeping a receiver of the UE active past the scheduled end of the DRX cycle) to detect the KA signal or paging notification signal. The UE may wait until the next DRX cycle before sending the next chirp, which may be detected by the updated serving cell.

According to aspects of the present disclosure, in a UL mobility based communication system, the network may transmit a KA to a UE only when the network is paging the UE, and the UE may transmit a chirp only when the UE is paged. The KA signal can be very reliable when transmitted via SFN or via multiple cells. This reliability can be used to save network and UE power, when compared with previously known techniques.

According to aspects of the present disclosure, in each DRX cycle, a UE may wake up and try to detect a KA signal. Receiving the KA signal is an example of receiving an indication of a request to transmit on the uplink access channel or of a keep-alive signal, as described above with reference to FIG. 11. If the KA signal is sent via SFN, then receiving the KA signal is an example of receiving a paging notification, wherein the paging notification is transmitted by a plurality of cells, as described above with reference to FIG. 13.

According to aspects of the present disclosure, the network (e.g., an ANC, an SRH) transmits a KA to a UE only if the UE is paged. Transmitting the KA is an example of transmitting an indication of a request to transmit on an uplink access channel or of a keep-alive signal, as described above with reference to FIG. 12. If the KA is transmitted via SFN, then transmitting the KA is also an example of transmitting a paging notification, to the UE, comprising a single frequency network (SFN) transmission, as described above with reference to FIG. 14.

According to aspects of the present disclosure, if the UE does not detect a KA signal during an active portion of a DRX cycle, the UE may go back to sleep until a next DRX cycle.

According to aspects of the present disclosure, if the UE detects a KA signal (e.g., during an active portion of a DRX cycle), the UE may transmit a chirp. Transmitting a chirp is an example of transmitting a signal on an uplink access channel, as described above with reference to FIGS. 9, 11, and 13.

The network (e.g., an AN) may receive the chirp and may select a serving cell for the UE based on the chirp. That is, a network controller (e.g., an ANC) may select a cell to serve the UE based on BSs and/or SRHs that receive the chirp. Receiving the chirp is an example of receiving a signal on the uplink access channel, as described above with reference to FIGS. 10 and 12.

If the network is unable to detect an expected chirp, then the network (e.g., a network controller, an MME) may infer that either a UE (e.g., the UE expected to transmit the expected chirp) did not detect the KA signal, or that a chirp transmitted by the UE is too weak to be detected by BSs (e.g., TRPs) of the network. In response, the network may initiate a radio link failure (RLF) and a recovery procedure to cause the UE to connect to the network or to another network.

If the network receives the chirp (as described above), then the network may inform the UE of the selected serving cell through a PCICH channel, which conveys a physical cell identifier (PCI) of the serving cell along with other information to the UE, enabling the UE to decode paging on the serving cell. The UE may then read paging from the serving cell and connect to the serving cell.

The UE may also measure zone sync or MRS-z signals. Zone measurement being equal to or lower than a threshold is an example of a trigger for a UE to transmit on an uplink access channel that may be included in a configuration for the UE, as described above with reference to FIGS. 9-14. Zone measurement being equal to or lower than a threshold may be another reason (e.g., a trigger that may be included in a configuration) for a UE to transmit a chirp, which may cause the network to update a serving cell of the UE, as described above.

According to aspects of the present disclosure, a UE may read (e.g., receive and decode) SFN KA signals and/or paging signals, and, if the UE is paged, then the UE may perform a cell search procedure to select a serving cell. After selecting the serving cell, the UE may then perform a random access channel (RACH) procedure to access the serving cell.

According to aspects of the present disclosure, the network (e.g., a network controller, a 5G MME) may send KA signals and/or paging notifications to one or more ANs for the ANs to transmit via SFN across multiple tracking areas (TAs).

According to aspects of the present disclosure, a UE performing DRX wakes up and may try to detect a KA signal on each DRX cycle. The network sends a KA signal only if the network is paging the UE. If the UE does not detect a KA signal, then the UE goes back to sleep until a next DRX cycle. If the UE detects a KA signal, then the UE may perform a cell search procedure to find and/or determine a strongest cell. After finding and/or determining a strongest cell, the UE may then perform a random access channel (RACH) procedure to access the strongest cell and the network.

Figure 16:
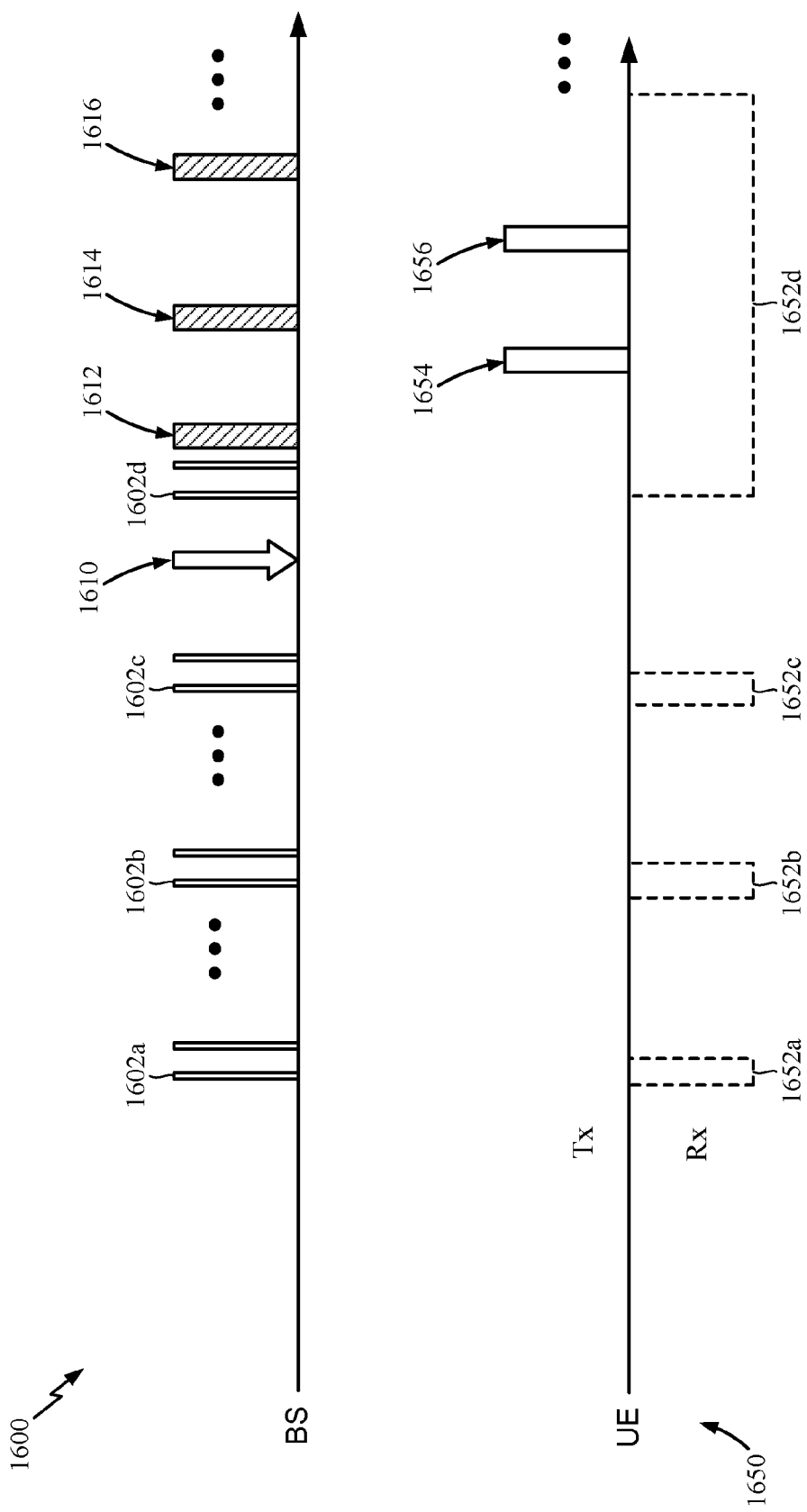
FIG. 16 illustrates exemplary transmission timelines for a BS and a UE operating according to aspects of the present disclosure.

FIG. 16 shows exemplary transmission timelines 1600, 1650 for a BS (e.g., SRH 722b, shown in FIG. 7) and a UE (e.g., UE 730, shown in FIG. 7) operating according to aspects of the present disclosure. In timeline 1600, the BS periodically transmits SFN SYNC signals at 1602a, 1602b, 1602c, 1602d. At 1610, data arrives at the BS for transmission to the UE. The BS waits until a time when the UE will be monitoring for KA signals and/or paging notification signals and transmits a paging notification message at 1612. In timeline 1650, the UE periodically wakes up to measure the SFN SYNC signal and to receive the PICH, as shown at 1652a, 1652b, 1652c, 1652d. In case there is no page indication (e.g., a paging notification) for the UE, the UE shuts off its receiver until the next periodic occasion, as shown at 1652a, 1652b, and 1652c. If a page indication message is received, such as the paging notification message at 1612, the UE may keep the receiver of the UE active past the end of the DRX active period and transmit on the uplink access channel, as at 1654. The transmission on the uplink access channel may be a chirp, as described above. When the BS detects the transmission on the uplink access channel, the BS transmits a cell ID of a serving cell on the PCICH of the UE at 1614. The UE receives the cell ID on the PCICH and transmits a RACH signal or other transmission to connect to the cell indicated by the cell ID at 1656. When the BS and the UE are connected, the BS transmits the data and/or other signaling for the UE at 1616.

According to aspects of the present disclosure, if the UE does not detect a KA signal during an active period of a DRX cycle, the UE may transmit on the uplink access channel (e.g., a chirp) and listen for a response message (e.g., a KA signal) from a BS. That is, if a UE wakes up and does not detect a KA signal, the UE may transmit a chirp or other signal to attempt to contact the network. If the UE does not contact the network, the UE may determine that RLF has occurred and may begin a recovery procedure.

According to aspects of the present disclosure, if the UE does not detect a KA signal during a threshold number of active periods of consecutive DRX cycles, the UE may transmit on the uplink access channel (e.g., a chirp) and listen for a response message (e.g., a KA signal) from a BS. That is, if a UE wakes up and does not detect a KA signal for a threshold number of consecutive DRX cycles, the UE may transmit a chirp or other signal to attempt to contact the network. If the UE does not contact the network, the UE may determine that RLF has occurred and may begin a recovery procedure.

According to aspects of the present disclosure, the BS may determine to transmit a third indication, to the UE, of a request to transmit on the uplink access channel or of a keep-alive signal. The BS may determine to transmit the third indication based on expiration of a timer, a measurement of uplink signal strength, an estimate of the downlink load, an estimate of the uplink load, an estimate of distance traveled by the UE since the last uplink transmission, and an estimate of the power consumption by the UE. For example, the BS may start a timer when transmitting a paging notification and, if the UE does not respond before the expiration of the timer, the BS may determine to transmit another paging notification. In another example, the BS may measure signal strength of a chirp from the UE as being below a threshold and determine to transmit a request for the UE to transmit another chirp, for the network to use in selecting a serving cell for the UE, for example. In yet another example, the BS may determine, based on an estimate of downlink load for a cell, to transmit a request for the UE to transmit a chirp, for the network to use in selecting a serving cell for the UE, for example. In another example, the BS may determine, based on an estimate of uplink load for a cell, to transmit a request for the UE to transmit a chirp, for the network to use in selecting a serving cell for the UE, for example. In still another example, the BS may determine, based on an estimate of distance traveled by the UE since a last uplink transmission, to transmit a request for the UE to transmit a chirp, for the network to use in selecting a serving cell for the UE, for example. In another example, the BS may determine, based on an estimate of power consumed by the UE, to transmit a KA to the UE, to assist the UE maintaining connectivity to the network while conserving power, for example.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900, 1000, 1100, 1200, 1300, and 1400 illustrated in FIGS. 9, 10, 11, 12, 13, and 14, may correspond to means 900A, 1000A, 1100A, 1200A, 1300A, and 1400A illustrated in FIGS. 9A, 10A, 11A, 12A, 13A, and 14A.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user equipment (UE), comprising:
   receiving a configuration indicating one or more triggers for transmitting on an uplink access channel, wherein the one or more triggers comprise a first indication of mobility of the UE;
   determining, based at least in part on detection of one of the one or more triggers, to transmit on the uplink access channel;
   transmitting a first signal on the uplink access channel;
   receiving, in response to the transmission of the first signal on the uplink access channel, a paging notification;
   receiving a cell identifier (ID) subsequent to receiving the paging notification to enable the UE to connect to a cell identified by the cell ID in response to the paging notification; and
   exchanging signaling with the cell identified by the cell ID.

2. The method of claim 1, wherein the first indication relates to an estimate of distance traveled by the UE since a last uplink transmission by the UE.

3. The method of claim 2, wherein the determination is based on detecting that the estimate of distance traveled by the UE since the last uplink transmission by the UE is greater than a threshold distance.

4. The method of claim 1, wherein the determination is also based on at least one of:
   an expiration of a timer,
   a measurement of a downlink signal strength being less than or equal to a first threshold,
   an estimate of downlink load being greater than or equal to a second threshold,
   an estimate of uplink load being greater than or equal to a third threshold, or
   an estimate of power consumption by the UE.

5. The method of claim 1, wherein the first signal transmitted on the uplink access channel is a contention based transmission.

6. The method of claim 1, wherein the first signal transmitted on the uplink access channel is a contentionless transmission.

7. The method of claim 1, wherein the paging notification is transmitted by a plurality of cells and the method further comprises:
   determining whether to transmit a second signal on the uplink access channel, based at least in part on the paging notification.

8. The method of claim 7, wherein the paging notification comprises a single frequency network (SFN) transmission wherein each cell of the plurality of cells transmits an identical transmission simultaneously.

9. The method of claim 1, further comprising:
   switching from a first state, wherein the UE periodically transmits first signals on the uplink access channel, to a second state, wherein the UE does not periodically transmit the first signals on the uplink access channel and transmits the first signals on the uplink access channel in response to detection of the one of the one or more triggers.

10. A method for wireless communications by a network comprising a zone, the zone comprising a plurality of cells, comprising:

transmitting, via a cell of the plurality of cells of the zone, a configuration indicating one or more triggers for a user equipment (UE) to transmit on an uplink access channel, wherein the one or more triggers comprise a first indication of mobility of the UE;

receiving a first signal on the uplink access channel from the UE;

transmitting, via the cell or an other cell of the plurality of cells of the zone, in response to the first signal, a paging notification;

transmitting a cell identifier (ID), to the UE, subsequent to transmitting the paging notification to enable the UE to connect to a cell identified by the cell ID in response to the paging notification, the cell identified by the cell ID being one of the plurality of cells of the zone; and exchanging signaling with the UE via the cell identified by the cell ID.

11. The method of claim 10, wherein the first indication relates to a first estimate of distance traveled by the UE since a last uplink transmission by the UE.

12. The method of claim 10, wherein the triggers further comprise at least one of:
expiration of a first timer,
a first measurement of a downlink signal strength being less than or equal to a first threshold,
a first estimate of downlink load being greater than or equal to a second threshold,
a first estimate of uplink load being greater than or equal to a third threshold, or
a first estimate of power consumption by the UE.

13. The method of claim 10, further comprising:
receiving a contention based transmission on the uplink access channel subsequent to transmitting the cell ID.

14. The method of claim 10, further comprising:
receiving a contentionless transmission on the uplink access channel subsequent to transmitting the cell ID.

15. The method of claim 10, further comprising:
determining to transmit a second indication, to the UE, of a request to transmit on the uplink access channel or of a keep-alive signal; and
transmitting, via any cell of the plurality of cells of the zone, the second indication to the UE.

16. The method of claim 15, wherein the determination is based on at least one of:
expiration of a second timer,
a measurement of uplink signal strength,
an estimate of downlink load,
an estimate of uplink load,
an estimate of distance traveled by the UE since a last uplink transmission by the UE, or
an estimate of power consumption by the UE.

17. The method of claim 10, wherein the first signal comprises a contention based transmission.

18. The method of claim 10, wherein the first signal comprises a contentionless transmission.

19. The method of claim 10, wherein transmitting the paging notification comprises transmitting a single frequency network (SFN) transmission, wherein each cell of a plurality of cells transmits an identical transmission simultaneously.

20. An apparatus for wireless communications, comprising:
a processing system configured to:
obtain, from a receiver, a configuration indicating one or more triggers for transmitting on an uplink access channel, wherein the one or more triggers comprise a first indication of mobility of the apparatus;
determine, based at least in part on detection of one of the one or more triggers, to cause a transmitter to transmit on the uplink access channel;
cause the transmitter to transmit a signal on the uplink access channel;
obtain, from the receiver and in response to the transmission of the first signal on the uplink access channel, a paging notification;
obtain, from the receiver, a cell identifier (ID) subsequent to obtaining the paging notification to enable the UE to connect to a cell identified by the cell ID in response to the paging notification; and
cause the transmitter and the receiver to exchange signaling with the cell identified by the cell ID; and
a memory coupled with the processing system.

21. The apparatus of claim 20, wherein the first indication relates to an estimate of distance traveled by the apparatus since a last uplink transmission by the apparatus.

22. The apparatus of claim 20, wherein the processing system is configured to cause the transmitter to transmit the first signal on the uplink access channel by causing the transmitter to transmit a contention based transmission.

23. The apparatus of claim 20, wherein the processing system is configured to cause the transmitter to transmit the first signal on the uplink access channel by causing the transmitter to transmit a contentionless transmission.

24. The apparatus of claim 20, wherein the processing system is further configured to:
cause the apparatus to switch from a first state, wherein the apparatus periodically transmits first signals on the uplink access channel, to a second state, wherein the apparatus does not periodically transmit the first signals on the uplink access channel and transmits the first signals on the uplink access channel in response to detection of the one of the one or more triggers.

25. An apparatus for wireless communications by a network comprising a zone, the zone comprising a plurality of cells, comprising:
a processing system configured to:
cause a transmitter to transmit, via a cell of the plurality of cells of the zone, a configuration indicating one or more triggers for a user equipment (UE) to transmit on an uplink access channel, wherein the one or more triggers comprise a first indication of mobility of the UE;
obtain, from a receiver, a first signal received on the uplink access channel from the UE;
cause, in response to the first signal, the transmitter or another transmitter to transmit, via the cell or an other cell of the plurality of cells of the zone, a paging notification;
cause the transmitter or another transmitter to transmit a cell identifier (ID), to the UE, subsequent to transmitting the paging notification to enable the UE to connect to a cell identified by the cell ID in response to the paging notification, the cell identified by the cell ID being one of the plurality of cells of the zone; and
exchanging signalling with the UE via the cell identified by the cell ID; and
a memory coupled with the processing system.

* * * * *